US008554906B2

(12) United States Patent
Nagai et al.

(10) Patent No.: US 8,554,906 B2
(45) Date of Patent: Oct. 8, 2013

(54) SYSTEM MANAGEMENT METHOD IN COMPUTER SYSTEM AND MANAGEMENT SYSTEM

(76) Inventors: Takayuki Nagai, Machida (JP); Masashi Kunii, Yokohama (JP)

( * ) Notice: Subject to any disclaimer, the term of this patent is extended or adjusted under 35 U.S.C. 154(b) by 432 days.

(21) Appl. No.: 12/812,708

(22) PCT Filed: May 10, 2010

(86) PCT No.: PCT/JP2010/057894

§ 371 (c)(1), (2), (4) Date: Jul. 13, 2010

(87) PCT Pub. No.: WO2011/118051

PCT Pub. Date: Sep. 29, 2011

(65) Prior Publication Data

US 2012/0023219 A1 Jan. 26, 2012

(30) Foreign Application Priority Data

Mar. 23, 2010 (JP) ................................ 2010-066546

(51) Int. Cl.
*G06F 15/16* (2006.01)

(52) U.S. Cl.
USPC .......................................... 709/224; 709/220

(58) Field of Classification Search
USPC ................................................ 709/224, 220
See application file for complete search history.

(56) References Cited

U.S. PATENT DOCUMENTS

| | | | | |
|---|---|---|---|---|
| 7,076,695 | B2 * | 7/2006 | McGee et al. | 714/47.2 |
| 7,107,185 | B1 | 9/2006 | Yemini et al. | |
| 7,188,166 | B2 * | 3/2007 | Minematsu | 709/223 |
| 7,457,864 | B2 * | 11/2008 | Chambliss et al. | 709/224 |
| 7,779,101 | B1 * | 8/2010 | Zahavi et al. | 709/223 |
| 8,086,708 | B2 * | 12/2011 | Breitgand et al. | 709/223 |
| 2007/0248017 | A1 * | 10/2007 | Hinata et al. | 370/238 |
| 2007/0283107 | A1 | 12/2007 | Ozaki et al. | |
| 2008/0016412 | A1 * | 1/2008 | White et al. | 714/48 |
| 2008/0098110 | A1 | 4/2008 | Takeda et al. | |
| 2008/0301763 | A1 * | 12/2008 | Sasaki et al. | 726/1 |
| 2009/0249213 | A1 | 10/2009 | Murase et al. | |
| 2009/0313198 | A1 | 12/2009 | Kudo et al. | |

FOREIGN PATENT DOCUMENTS

| | | |
|---|---|---|
| JP | 2001-343177 | 12/2001 |
| JP | 2005-62941 | 3/2005 |
| JP | 2006-295413 | 10/2006 |
| JP | 2007-328396 | 12/2007 |

(Continued)

OTHER PUBLICATIONS

PCT International Search Report on Application No. PCT/JP2010/057894 dated Aug. 3, 2010; 2 pages.

(Continued)

*Primary Examiner* — Kevin Bates

(74) *Attorney, Agent, or Firm* — Foley & Lardner LLP

(57) ABSTRACT

To enable the setting of a suitable threshold for a component of each of apparatuses configuring a system. By using management software, a threshold for monitoring the performance of an apparatus to be monitored is set beforehand. When an acquired performance value exceeds the threshold, the acquired performance value is detected as a performance fault event. Further, the management software has a correlation analysis rule representing a causal relationship between the performance fault events in the managed apparatus. When detecting an event, the management software performs fault cause analysis processing to specify a fault cause apparatus and an apparatus (affected apparatus) affected by the fault from a plurality of received events.

11 Claims, 24 Drawing Sheets

(56) References Cited

FOREIGN PATENT DOCUMENTS

| | | |
|---|---|---|
| JP | 2009-116618 A | 5/2009 |
| JP | 2009-193486 | 8/2009 |
| JP | 2009-206850 | 9/2009 |

OTHER PUBLICATIONS

Japan Patent Office Notice of Reasons for Rejection on application 2010-066546 dated Dec. 4, 2012; pp. 1-4.

* cited by examiner

| Drive name (13310) | iSCSI initiator name (13320) | Connection destination iSCSI target (13330) | LUN ID (13340) | Response time (msec) (13350) |
|---|---|---|---|---|
| E: | com.hitachi.sv1 | com.hitachi.sto1 | 0 | 5 |
| F: | com.hitachi.sv1 | com.hitachi.sto1 | 1 | 2 |
| : | : | : | : | : |

| Drive name (13310) | iSCSI initiator name (13320) | Connection destination iSCSI target (13330) | LUN ID (13340) | Response time (msec) (13350) |
|---|---|---|---|---|
| E: | com.hitachi.sv2 | com.hitachi.sto2 | 0 | 5 |
| : | : | : | : | : |

| Drive name (13310) | iSCSI initiator name (13320) | Connection destination iSCSI target (13330) | LUN ID (13340) | Response time (msec) (13350) |
|---|---|---|---|---|
| E: | com.hitachi.sv3 | com.hitachi.sto3 | 0 | 15 |
| : | : | : | : | : |

| Port ID (13410) | MAC address (13420) | iSCSI initiator name (13430) |
|---|---|---|
| LAN1 | 11:11:11:11:11:11 | com.hitachi.sv1 |
| : | : | : |

| Port ID (13410) | MAC address (13420) | iSCSI initiator name (13430) |
|---|---|---|
| LAN1 | 11:11:11:11:11:21 | com.hitachi.sv2 |
| : | : | : |

| Port ID (13410) | MAC address (13420) | iSCSI initiator name (13430) |
|---|---|---|
| LAN1 | 11:11:11:11:11:31 | com.hitachi.sv3 |
| : | : | : |

| Volume ID (23210) | Capacity (23220) | Target ID (23230) | LUN ID (23240) | Response time (msec) (23250) |
|---|---|---|---|---|
| VOL1 | 20GB | TG1 | 0 | 5 |
| VOL2 | 20GB | TG1 | 1 | 7 |
| VOL3 | 20GB | TG2 | 0 | 4 |
| VOL4 | 20GB | TG2 | 1 | 5 |
| VOL5 | 40GB | TG3 | 0 | 3 |
| VOL6 | 40GB | TG3 | 1 | 1 |
| : | : | : | : | : |

| Target ID (23310) | iSCSI target name (23320) | Connection permitted iSCSI initiator (23330) |
|---|---|---|
| TG1 | com.hitachi.sto1 | com.hitachi.sv1, com.hitachi.sv11 |
| TG2 | com.hitachi.sto2 | com.hitachi.sv2 |
| TG3 | com.hitachi.sto3 | com.hitachi.sv3 |
| : | : | : |

| Port ID (23410) | MAC address (23420) | Target ID (23430) | I/O amount per unit time (IOPS) (23440) |
|---|---|---|---|
| PORT1 | 22:22:22:22:22:11 | TG1, TG2 | 300 |
| PORT2 | 22:22:22:22:22:12 | TG3 | 400 |
| : | : | : | : |

| Controller ID (23510) | Port ID (23520) | Operation rate (%) (23530) |
|---|---|---|
| CTL1 | PORT1 | 40 |
| CTL2 | PORT2 | 60 |
| : | : | : |

| Apparatus ID (32110) | Device ID (32120) | Metric (32130) | Performance value (32140) | Alert execution threshold (32150) | Measured value based threshold (32160) | Threshold class (32170) | Status (32180) |
|---|---|---|---|---|---|---|---|
| SYS1 | CTL1 | Operation rate | 40(%) | 20(%) | 40(%) | Upper limit | Abnormal |
| SYS1 | CTL2 | Operation rate | 60(%) | 80(%) | - | Upper limit | Normal |
| SYS1 | PORT1 | I/O amount per unit time | 300(IOPS) | 1000(IOPS) | - | Upper limit | Normal |
| SYS1 | PORT2 | I/O amount per unit time | 400(IOPS) | 1000(IOPS) | - | Upper limit | Normal |
| HOST1 | E: | Response time | 5(msec) | 10(msec) | - | Upper limit | Normal |
| HOST1 | F: | Response time | 5(msec) | 10(msec) | - | Upper limit | Normal |
| HOST2 | E: | Response time | 5(msec) | 8(msec) | - | Upper limit | Normal |
| HOST3 | E: | Response time | 15(msec) | 10(msec) | - | Upper limit | Normal |
| : | : | : | : | : | : | : | : |

| Apparatus ID (32210) | Volume ID (32220) | Port name (32230) | Controller name (32240) | Connection destination host ID (32250) | Connection destination drive name (32260) | Connection destination port name (32270) |
|---|---|---|---|---|---|---|
| SYS1 | VOL1 | PORT1 | CTL1 | HOST1 | E: | LAN1 |
| | VOL2 | PORT1 | CTL1 | HOST1 | F: | LAN1 |
| | VOL3 | PORT1 | CTL1 | HOST2 | E: | LAN1 |
| | VOL5 | PORT2 | CTL2 | HOST3 | E: | LAN1 |
| : | : | : | : | : | : | : |

| Apparatus ID (33710) | Apparatus portion ID (33720) | Metric (33730) | Status (33740) | Generation date and time (33750) |
|---|---|---|---|---|
| SYS1 | CTL1 | Operation rate | Abnormal relative to threshold | 2010-01-01 15:00:00 |
| SYS1 | CTL1 | Operation rate | Normal | 2010-01-01 15:01:00 |
| SYS1 | CTL1 | Operation rate | Abnormal relative to threshold | 2010-01-01 16:00:00 |
| HOST3 | E: | Response time | Abnormal relative to threshold | 2010-01-01 15:00:00 |
| HOST3 | E: | Response time | Normal | 2010-01-01 15:01:00 |
| HOST3 | E: | Response time | Abnormal relative to threshold | 2010-01-01 16:00:00 |
| : | : | : | : | : |

| | | Apparatus class | Apparatus portion class | Metric | Status |
|---|---|---|---|---|---|
| | | | | | |
| 33810 | Condition portion | Host computer | Drive | Response time | Abnormal relative to threshold |
| | | Storage apparatus | Controller | Operation rate | Abnormal relative to threshold |
| 33820 | Conclusion portion | Storage apparatus | Controller | Operation rate | Bottleneck |
| 33830 | General-purpose rule ID | Rule1 | | | |
| 33840 | Application topology | Volume topology management table | | | |

| | | Apparatus class | Apparatus portion class | Metric | Status |
|---|---|---|---|---|---|
| | | | | | |
| 33810 | Condition portion | Host computer | Drive | Response time | Abnormal relative to threshold |
| | | Storage apparatus | Controller | Operation rate | Normal |
| | | Storage apparatus | Port | I/O amount per unit time | Normal |
| 33820 | Conclusion portion | IP switch | - | - | Bottleneck |
| 33830 | General-purpose rule ID | Rule2 | | | |
| 33840 | Application topology | Volume topology management table | | | |

| | Apparatus ID | Apparatus portion ID | Metric | Status |
|---|---|---|---|---|
| 33910 Condition portion | HOST1 | E: | Response time | Abnormal relative to threshold |
| | SYS1 | CTL1 | Operation rate | Abnormal relative to threshold |
| 33920 Conclusion portion | SYS1 | CTL1 | Operation rate | Bottleneck |
| 33930 Expansion rule ID | ExRule1-1 | | | |
| 33940 General-purpose rule ID before expansion | Rule-1 | | | |

| | Apparatus ID | Apparatus portion ID | Metric | Status |
|---|---|---|---|---|
| 33910 Condition portion | HOST1 | F: | Response time | Abnormal relative to threshold |
| | SYS1 | CTL1 | Operation rate | Abnormal relative to threshold |
| 33920 Conclusion portion | SYS1 | CTL1 | Operation rate | Bottleneck |
| 33930 Expansion rule ID | ExRule1-2 | | | |
| 33940 General-purpose rule ID before expansion | Rule-1 | | | |

| | | Apparatus ID | Apparatus portion ID | Metric | Status |
|---|---|---|---|---|---|
| 33910 | Condition portion | HOST2 | E: | Response time | Abnormal relative to threshold |
| | | SYS1 | CTL1 | Operation rate | Abnormal relative to threshold |
| 33920 | Conclusion portion | SYS1 | CTL1 | Operation rate | Bottleneck |
| 33930 | Expansion rule ID | ExRule1-3 | | | |
| 33940 | General-purpose rule ID before expansion | Rule-1 | | | |

| | | Apparatus ID | Apparatus portion ID | Metric | Status |
|---|---|---|---|---|---|
| 33910 | Condition portion | HOST3 | E: | Response time | Abnormal relative to threshold |
| | | SYS1 | CTL2 | Operation rate | Abnormal relative to threshold |
| 33920 | Conclusion portion | SYS1 | CTL2 | Operation rate | Bottleneck |
| 33930 | Expansion rule ID | ExRule1-4 | | | |
| 33940 | General-purpose rule ID before expansion | Rule-1 | | | |

| Correction target apparatus ID | Correction target portion ID | Correction target metric | Expansion rule ID | Event reception | Generation rate of other event | Measured value at the time of reception | Analysis start date and time |
|---|---|---|---|---|---|---|---|
| SYS1 | CTL1 | Operation rate | ExRule1-1 | Yes | 0/1 | 40(%) | 2010-01-01 16:00:00 |
| | | | ExRule1-2 | Yes | 0/1 | | |
| SYS1 | CTL1 | Operation rate | ExRule1-1 | Yes | 0/1 | 45(%) | 2010-01-01 15:00:00 |
| | | | ExRule1-2 | Yes | 0/1 | | |
| SYS1 | CTL2 | Operation rate | ExRule1-4 | No | 1/1 | - | 2010-01-01 16:00:00 |
| SYS1 | CTL2 | Operation rate | ExRule1-4 | No | 1/1 | | 2010-01-01 15:00:00 |
| : | : | : | : | : | : | : | : |

| Apparatus class | Device class | Metric | Priority |
|---|---|---|---|
| Storage | Controller | Operation rate | 1 |
| | Port | I/O amount per unit time | 2 |
| | Volume | Response time | 3 |
| Server | Disk | Response time | 4 |
| : | : | : | : |

| Apparatus ID (34210) | Device ID (34220) | Metric (34230) | Correction class (34240) | Correction rate (34250) |
|---|---|---|---|---|
| Storage | Controller | Operation rate | Increase | 2% |
| | | | Decrease | 2% |
| | Port | I/O amount per unit time | Increase | 2% |
| | | | Decrease | 2% |
| | Volume | Response time | Increase | 2% |
| | | | Decrease | 2% |
| : | : | : | : | : |

| Correction target ID (34010) | Correction target portion ID (34020) | Correction target metric (34030) | Expansion rule ID (34040) | Event reception (34050) | Generation rate of other event (34060) | Analysis start date and time (34080) | Reference event metric (34090) | Reference event threshold (34100) |
|---|---|---|---|---|---|---|---|---|
| SYS1 | CTL1 | Operation rate | ExRule1-1 | Yes | 0/1 | 2010-01-01 16:05:00 | Server disk response time | 10(msec) |
| | | | ExRule1-2 | Yes | 0/1 | | | |
| SYS1 | CTL1 | Operation rate | ExRule1-1 | Yes | 0/1 | 2010-01-01 15:05:00 | | 10(msec) |
| | | | ExRule1-2 | Yes | 0/1 | | | |
| SYS1 | CTL2 | Operation rate | ExRule1-4 | No | 1/1 | 2010-01-01 16:05:00 | Server disk response time | 10(msec) |
| SYS1 | CTL2 | Operation rate | ExRule1-4 | No | 1/1 | 2010-01-01 15:05:00 | | |
| : | : | : | : | : | : | : | | : |

SYSTEM MANAGEMENT METHOD IN COMPUTER SYSTEM AND MANAGEMENT SYSTEM

TECHNICAL FIELD

The present invention relates to a system management method in a computer system and to a management system. For example, the present invention relates to a technique for managing a system including a host computer, a network switch, and a storage.

BACKGROUND ART

In software for managing a computer system, for example, as shown in Patent Literature 1, a cause event is detected from a plurality of detected faults or the signs of the detected faults. More specifically, the management software described in Patent Literature 1 detects, as an event, an excess of performance value relative to a threshold in an apparatus under management, and accumulates the event in an event DB. Further, the management software has an analysis engine for analyzing a causal relationship between a plurality of fault events generated in the apparatus under management. The analysis engine accesses a configuration DB having inventory information on the apparatus under management, so as to recognize components in the apparatus, which are connected to I/O channel paths. Thereby, the analysis engine recognizes, as one group referred to as "topology," the components which can affect the performance of a logical volume on the host. When an event is generated, the analysis engine applies an analysis rule, consisting of a predetermined condition sentence and analysis result, to each of the topologies, so as to construct an expansion rule. The expansion rule includes a cause event, which is a cause of performance degradation in the other apparatus, and a group of related events caused by the cause event. Specifically, an event described as a root cause of a fault in the "THEN" portion of the rule is the cause event, and events other than the cause event, which are described in the "IF" portion of the rule, are the related events.

On the other hand, techniques for managing performance faults are described in Patent Literature 2 and Patent Literature 3.

Patent Literature 2 discloses a technique for managing a storage system including a host apparatus in which a predetermined application is mounted, a storage apparatus which provides a storage area used by the application, and a host server which performs data communication between the host apparatus and the storage apparatus. In Patent Literature 2, a group of host computers referring to a storage area in a certain storage apparatus are searched and detected on the basis of mapping information between the storage apparatus and the host computers. Further, a report of I/O contention narrowed down only to the performance data of the host computer group is created and presented to a system manager, so as to thereby facilitate identification of a host computer group causing I/O contention on the resource of the storage apparatus, and identification of a component acting as a bottleneck in the performance of the storage apparatus.

Patent Literature 3 discloses a technique for managing a storage system including a host apparatus in which a predetermined application is mounted, a storage apparatus which provides a storage area used by the application, and a host server which performs data communication between the host apparatus and the storage apparatus. In Patent Literature 3, current performance values of respective performance information collection targets existing on the data path between the host server and the storage apparatus are collected, so that whether or not a performance problem of the application occurs is determined on the basis of a preset target performance value and the current performance value of the application. Then, a threshold of the performance value of each of the performance information collection targets is set on the basis of the current performance value of each of the performance information collection targets and on the basis of the determination result of the presence of generation of the performance problem.

CITATION LIST

Patent Literatures

Patent Literature 1: U.S. Pat. No. 7,107,185

Patent Literature 2: JP Patent Publication (Kokai) No. 2005-62941A

Patent Literature 3: JP Patent Publication (Kokai) No. 2007-328396A

SUMMARY OF INVENTION

Technical Problem

In Patent Literature 2, when the threshold used to monitor the performance of the system performance management software is given, the original performance of the component is not necessarily taken into consideration. When the threshold is set without taking into consideration the original performance of the component, a situation in which a warning is generated despite the fact that no performance fault is generated or, on the contrary, a situation in which no warning is generated even when a performance fault is generated, is caused, so as to thereby confuse the manager of the system. As a measure for preventing such situation, it is only necessary for the user to calculate and set the threshold corresponding to the performance unique to the apparatus to be managed.

However, it is easy for the user to estimate the performance requirement for a component located at Front End, such as a logical volume on a business host, but it is difficult for the user to estimate the performance requirement for a storage switch, and the like, located at Back End.

Patent Literature 3 describes a technique in which a current performance value of each of the performance information collection targets existing on the data path between the host server and the storage apparatus is collected, in which whether or not a performance problem is caused in the application is determined on the basis of the preset target performance value and the current performance value of the application, and in which the threshold of the performance value of each of the performance information collection targets is set on the basis of the current performance value of each of the performance information collection targets and on the basis of the determination result of the presence of generation of the performance problem.

However, the performance fault management techniques, which are based on the threshold and which are described in Patent Literatures 2 and 3, cannot be easily applied to the management software which specifies a cause event on the basis of the rule as disclosed in Patent Literature 1.

The present invention has been made in view of the above described circumstances. An object of the present invention is to provide a technique capable of setting a threshold suitable for a component of each of apparatuses configuring a system.

Solution to Problem

To this end, in the present invention, a threshold used for performance monitoring is set beforehand for a management target apparatus by using a management software, so that in a case where an acquired performance value exceeds the threshold, the case is detected as a performance fault event. Further, the management software has correlation analysis rules which represent causal relationships between performance fault events in the managed apparatus. When detecting an event, the management software performs fault cause analysis processing, so as to specify, from a plurality of received events, a fault cause apparatus and an apparatus (affected apparatus) affected by the fault.

The system management software according to the present invention has a threshold re-calculation function for making the threshold matched with the performance capacity of the component. In the case where no affected apparatus is specified in the above described fault cause analysis, the threshold re-calculation function corrects the threshold of the apparatus assumed as the fault cause apparatus, in the direction of tightening the threshold. Further, in the case where no fault cause apparatus is specified in the above described fault cause analysis, the threshold re-calculation function corrects the threshold of the apparatus assumed as the fault cause apparatus, in the direction of relaxing the threshold.

Further features of the present invention will become apparent by referring to the following embodiments for implementing the present invention and by referring to the accompanying drawing.

Advantageous Effects of Invention

According to the present invention, a threshold for performance management, which is given to an apparatus managed by the system management software, can be made to match with the original performance capacity of the apparatus, as a result of which the management software can accurately issue a performance fault warning to the manager.

BRIEF DESCRIPTION OF DRAWINGS

FIG. 5A shows a configuration example of a logical volume management table provided in, for example, a host computer 1 in the present invention.

FIG. 5B shows a configuration example of a logical volume management table provided in, for example, a host computer 2 in the present invention.

FIG. 5C shows a configuration example of a logical volume management table provided in, for example, a host computer 3 in the present invention.

FIG. 6A shows a configuration example of an iSCSI initiator management table provided in, for example, the host computer 1 in the present invention.

FIG. 6B shows a configuration example of an iSCSI initiator management table provided in, for example, the host computer 2 in the present invention.

FIG. 6C shows a configuration example of an iSCSI initiator management table provided in, for example, the host computer 3 in the present invention.

FIG. 7 shows a configuration example of a volume management table provided in the storage apparatus in the present invention.

FIG. 8 shows a configuration example of an iSCSI target management table provided in the storage apparatus in the present invention.

FIG. 9 shows a configuration example of an I/O port management table provided in the storage apparatus in the present invention.

FIG. 10 shows a configuration example of a controller management table provided in the storage in the present invention.

FIG. 11 shows a configuration example of an apparatus performance management table provided in the management server in the present invention.

FIG. 12 shows a configuration example of a volume topology management table provided in the management server in the present invention.

FIG. 13 shows a configuration example of an event management table provided in the management server in the present invention.

FIG. 14A shows a configuration example (1) of a general-purpose rule provided in the management server in the present invention.

FIG. 14B shows a configuration example (2) of a general-purpose rule provided in the management server in the present invention.

FIG. 15A shows a configuration example (1) of an expansion rule provided in the management server in the present invention.

FIG. 15B shows a configuration example (2) of an expansion rule provided in the management server in the present invention.

FIG. 15C shows a configuration example (3) of an expansion rule provided in the management server in the present invention.

FIG. 15D shows a configuration example (4) of an expansion rule provided in the management server in the present invention.

FIG. 18 shows a configuration example of an analysis result management table provided in the management server in the present invention.

FIG. 19 shows a configuration example of a threshold correction priority management table provided in the management server in the present invention.

FIG. 20 shows a configuration example of a threshold correction rate management table provided in the management server in the present invention.

FIG. 26 shows a configuration example of an analysis result management table provided in the management server in a third embodiment according to the present invention.

DESCRIPTION OF EMBODIMENTS

Figure 1:
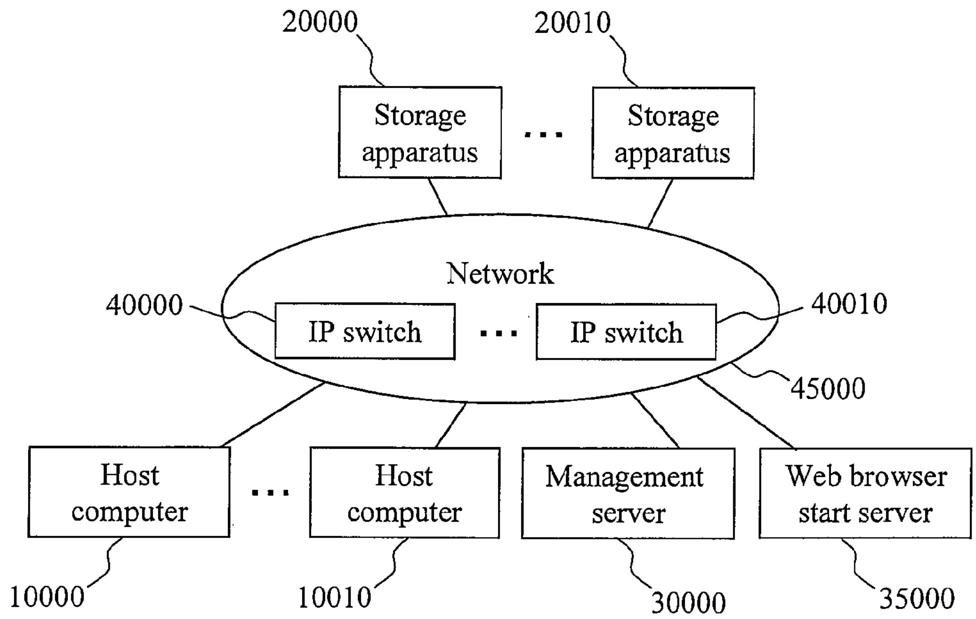
FIG. 1 shows an example of a physical schematic configuration of a computer system according to the present invention.

In the following, embodiments according to the present invention will be described with reference to accompanying drawings. However, it should be noted that the present embodiments are only examples for realizing the present invention, and do not limit the technical scope of the present invention. Further, in each of the figures, the same component is denoted by the same reference numeral.

Note that in this specification, the information used in the present invention is represented by an expression of "aaa table," but the information may be represented by expressions, such as "aaa chart," "aaa list," "aaa DB," "aaa queue," and may also be represented by forms other than the data structures, such as a table, a chart, a list, a DB, a queue. For this reason, "aaa table," "aaa list," "aaa DB," "aaa queue," and the like, may be referred to as "aaa information" in order to indicate that the information used in the present invention does not depend on the data structure.

Further, when the contents of each information are described, expressions, such as "identification information," "identifier," "name," and "ID" are used, but these can be substituted for each other.

Further, in the following description of a processing operation according to the present invention, there is a case where the description is made by using a "program" or a "module" as an operation subject (subject). However, the program and the module are executed by a processor and thereby perform determined processing by using a memory and a communication port (communication controller). Thus, the processing may be read as the processing performed by the processor as the operation subject (subject). Further, the processing, which is disclosed to use the program and the module as the subject, may be read as the processing performed by a computer, such as a management server, and by an information processing apparatus. A part of or all of the program may be realized by dedicated hardware. Further, various programs may be installed in each computer by a program distribution server and storage media.

(1) First Embodiment

A first embodiment relates to threshold relaxation processing and threshold tightening processing which are performed by management software.

<System Configuration>

FIG. 1 shows a physical configuration of a computer system according to the present invention. The computer system includes a storage apparatus 20000, a host computer 10000, a management server 30000, a WEB browser start server 35000, and an IP switch 40000, and is configured by connecting these apparatuses to each other by a network 45000.

The host computers 10000 to 10010 receive a file I/O request from a client computer (not shown) connected to the host computers, and realize an access to the storage apparatuses 20000 to 20010 on the basis of the file I/O request. Further, the management server (management computer) 30000 manages the operation of the computer system as a whole.

The WEB browser start server 35000 performs communication with a GUI display processing module 33400 of the management server 30000 via the network 45000, and displays various kinds of information on the WEB browser. A user manages the apparatuses in the computer system by referring to the information displayed on the WEB browser on the WEB browser start server. However, the management server 30000 and the WEB browser start server 35000 may be configured by one server.

<Internal Configuration of Host Computer>

Figure 2:
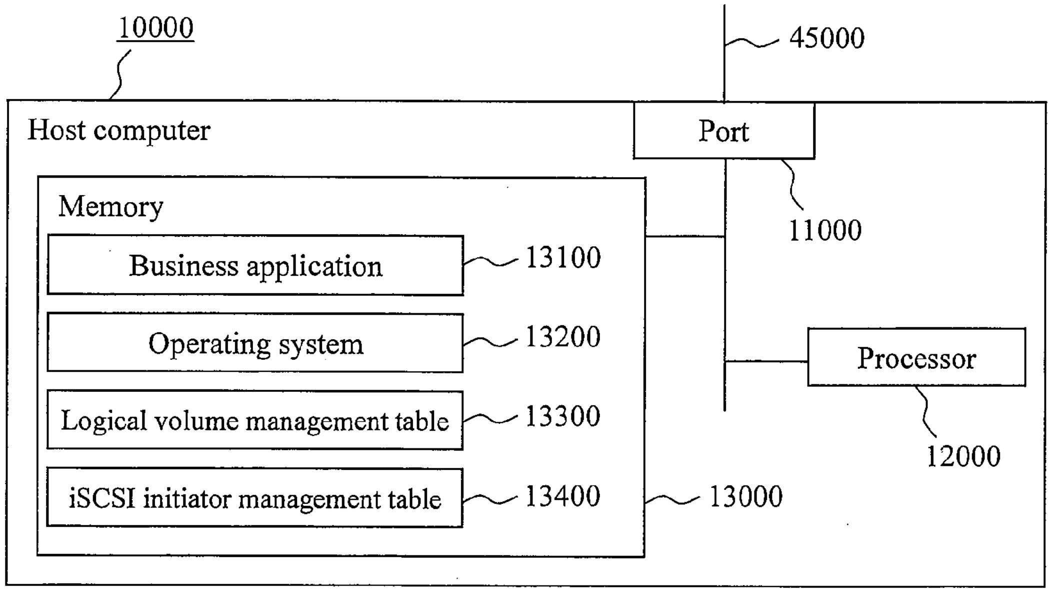
FIG. 2 shows a detailed configuration example of a host computer according to the present invention.

FIG. 2 shows an example of a detailed internal configuration of the host computer 10000 according to the present invention. The host computer 10000 includes a port 11000 for connecting the host computer 10000 to the network 45000, a processor 12000, and a memory 13000 (in which a disk apparatus may be included), and is configured by connecting these to each other via a circuit, such as an internal bus.

A business application 13100, an operating system 13200, a logical volume management table 13300, and an iSCSI initiator management table 13400 are stored in the memory 13000.

The business application 13100 uses a storage area provided by the operating system 13200 and performs data input and output (hereinafter referred to as I/O) to and from the storage area.

The operating system 13200 performs processing for making the business application 13100 recognize, as a storage area, a logical volume on the storage apparatuses 20000 to 20010 connected to the host computer 10000 via the network 45000.

In FIG. 2, the port 11000 is represented as a single port which includes an I/O port used to perform communication with the storage apparatus 20000 on the basis of the iSCSI, and a management port used by the management server 30000 to acquire management information in the host computer. However, the port 11000 may be divided into the I/O port used to perform communication based on the iSCSI and the management port.

Note that the logical volume management table 13300 and the iSCSI initiator management table 13400 will be described below (see FIG. 5 and FIG. 6).

<Internal Configuration of Storage Device>

Figure 3:
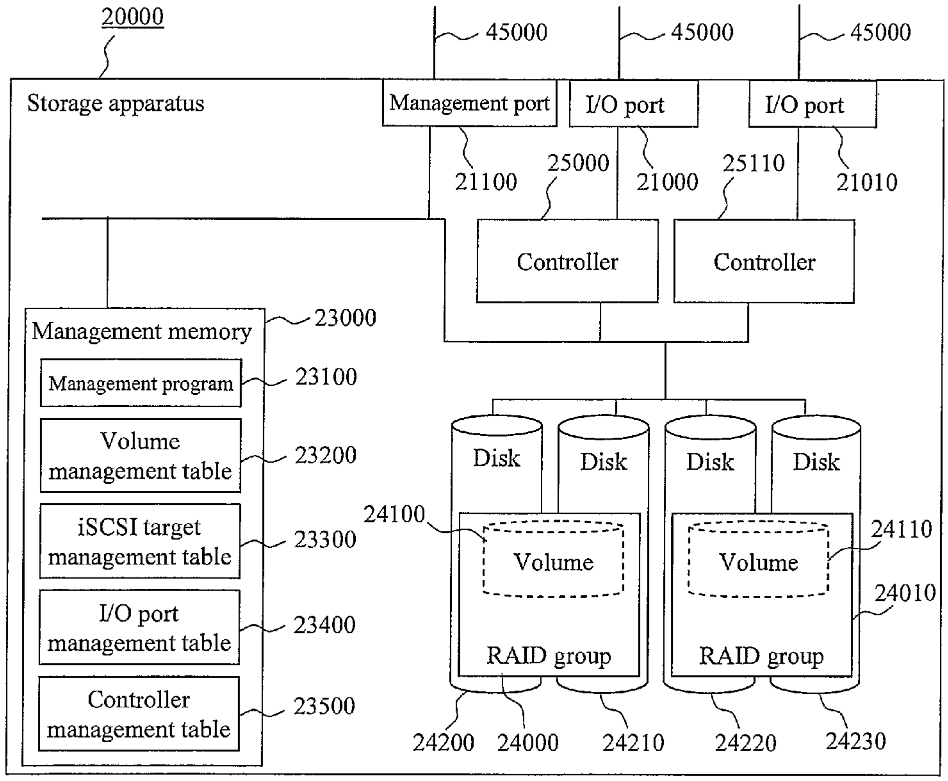
FIG. 3 shows a detailed configuration example of a storage apparatus according to the present invention.

FIG. 3 shows an example of a detailed internal configuration of the storage apparatus 20000 according to the present invention. The storage apparatus 20010 has the same configuration.

The storage apparatus 20000 includes I/O ports 21000 and 21010 for connecting the storage apparatus 20000 to the host computer 10000 via the network 45000, a management port 21100 for connecting the storage apparatus 20000 to the management server 30000 via the network 45000, a management memory 23000 for storing various kinds of management information, RAID groups 24000 to 24010 for storing data, and controllers 25000 and 25110 for controlling data and management information in the management memory, and is configured by connecting these to each other via a circuit, such as an internal bus. Note that the connection of the RAID groups 24000 to 24010 more specifically means that the storage devices configuring the RAID groups 24000 to 24010 are connected to the other components.

The management memory 23000 stores a management program 23100 of the storage apparatus, a volume management table 23200, an iSCSI target management table 23300, a volume management table 23400, and a controller management table 23500.

The RAID groups 24000 to 24010 are configured by one or more magnetic disks 24200, 24210, 24220, and 24230, respectively. In the case where the storage apparatus is configured by a plurality of magnetic disks, the magnetic disks may be organized into the RAID configuration. Further, the RAID groups 24000 to 24010 are logically divided into a plurality of volumes 24100 to 24110.

Note that as long as the logical volumes 24100 and 24110 are configured by using the storage area of one or more magnetic disks, the magnetic disks do not need to be organized into the RAID configuration. Further, as long as a storage area corresponding to the logical volume can be provided, a storage device using the other storage medium, such as flash memory, may also be used as a substitute of the magnetic disk.

Each of the controllers 25000 and 25110 includes therein a processor which performs control of the storage apparatus 20000, and a cache memory which temporarily stores data that are exchanged with the host computer 10000. Also, each of the controllers is provided between the I/O port and the RAID group, so as to perform data transfer between the I/O port and the RAID group.

Note that the storage apparatus 20000 may have a configuration other than the above described configuration in FIG. 3, as long as the storage apparatus 20000 includes the above described storage device which provides a storage area, and the storage controller which provides a logical volume to any one of the host computers, which receives an access request (indicating an I/O request), and which performs a writing operation to the storage device according to the received access request. For example, the storage apparatus 20000 may be configured such that the storage controller and the storage device providing the storage area are housed in separate cases, respectively. That is, in the example shown in FIG. 3, the management memory 23000, and the controllers 25000 and 25110 may be configured as a storage controller. Further, in this specification, as a substitute expression in the case where the storage controller and the storage device are included in the same housing, or respectively included in different housings, the storage apparatus may be referred to as a storage system.

<Internal Configuration of Management Server>

Figure 4:
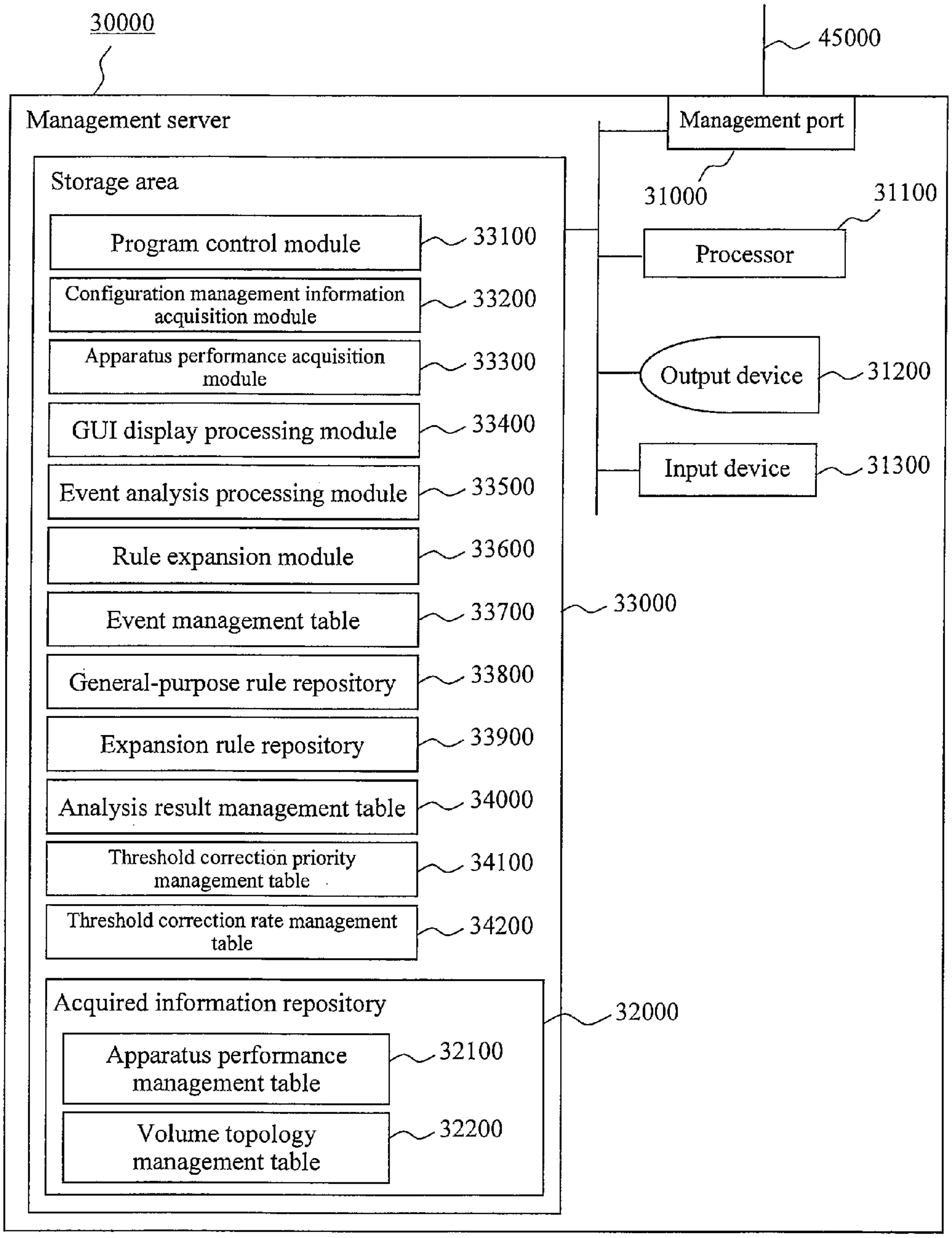
FIG. 4 shows a detailed configuration example of a management server according to the present invention.

FIG. 4 shows an example of a detailed internal configuration of the management server 30000 according to the present invention. The management server 30000 includes a management port 31000 for connecting the management server 30000 to the network 45000, a processor 31100, an acquired information repository 32000, a storage area 33000, an output device 31200, such as a display device, for outputting a processing result as will be described below, and an input device 31300, such as a keyboard, used by a storage manager to input an instruction, and is configured by connecting these to each other via a circuit, such as an internal bus.

The storage area 33000 stores a program control module 33100, a configuration management information acquisition module 33200, an apparatus performance acquisition module 33300, the GUI display processing module 33400, an event analysis processing module 33500, a rule expansion module 33600, an event management table 33700, a general rule repository 33800, an expansion rule repository 33900, an analysis result management table 34000, a threshold correction priority management table 34100, a threshold correction rate management table 34200, and the acquired information repository 32000. Note that the storage area 33000 is configured by one of the semiconductor memory and the magnetic disk, or by both of the semiconductor memory and the magnetic disk. Further, in FIG. 4, each of the modules is provided as a software module in the storage area 33000, but may also be provided as a hardware module. Further, the processing performed by each of the modules may be provided as one or more program codes, and a clear boundary between the modules does not need to be provided.

The acquired information repository 32000 stores an apparatus performance management table 32100 and a volume topology management table 32200.

The GUI display processing module 33400 displays acquired configuration management information via the output device 31200 according to a request received from the manager through the input device 31300. Note that the input device and the output device may be devices different from each other, or may also be one or more integrated devices.

Note that the management server (management computer) includes, as input output devices, for example, a display, a keyboard, a pointer device, and the like, but may be an apparatus having the other configuration. Further, the input and display operations performed by the input and output devices may be substituted in such a manner that a serial interface or an Ethernet interface is used as a substitute of the input and output devices, so as to be connected to a display computer having a display, a keyboard, or a pointer device, and that the display and input reception are performed by the display computer by transmitting the display information to the display computer and by receiving the input information from the display computer.

In this specification, a group of one or more computers, which manage a computer system (information processing system) and which display the display information, may be referred to as a management system. When the management server displays the display information, the management server is the management system, and a combination of the management server and the display computer (for example, the WEB browser start server 35000 shown in FIG. 1) is also the management system. Further, the processing equivalent to the processing performed by the management server may also be realized by a plurality of computers in order to improve the processing speed and reliability of the management processing. In this case, the plurality of computers (including a display computer in the case where the display operation is performed by the display computer) serve as the management system.

<Configuration of Logical Volume Management Table>

FIG. 5A to FIG. 5C show a configuration example of the logical volume management table 13300 provided in the host computer 10000. For example, in the case where a plurality of host computers are provided, the logical volume management table 13300 is provided, as shown in FIG. 5A to FIG. 5C, in each of the host computers so as to be able to be individually managed.

The logical volume management table 13300 includes, as configuration items, a field 13310 for registering a drive name used as an identifier of each of logical volumes in the host computer, a field 13320 for registering an iSCSI initiator name used as an identifier of the I/O port 11000 on the host computer, which port is used in the case of communication with the storage apparatus provided with the actual device for the logical volume, a field 13330 for registering a connection destination iSCSI target used as an identifier of the I/O port 21000 on the storage apparatus, which port is used in the case of communication with the storage apparatus provided with the actual device for the logical volume, a field 13340 for registering a LUN ID used as an identifier of a logical volume in the storage apparatus, and a field 13350 for storing a response time (current instant value) which is a response time in the case where an I/O operation is performed from the business application 13200 of the host computer to the each logical volume (drive).

For example, it can be seen from FIG. 5A that a logical volume designated by a drive name (E:) on the host computer is connected to a storage apparatus via a port on the host computer, which port is designated by an iSCSI initiator name of com.hitachi.sv1, and via a port on the storage apparatus, which port is designated by an iSCSI target name of com.hitachi.sto1, that the logical volume has a LUN ID of 0 on the storage apparatus, and that the response time at this time was 5 msec.

<Configuration of iSCSI Initiator Management Table>

FIG. 6A to FIG. 6C show a configuration example of the iSCSI initiator management table 13400 provided in the host computer 10000. In the case where a plurality of host computers are provided, the iSCSI initiator is also managed in each of the host computers.

The iSCSI initiator management table 13400 includes, as configuration items, a field 13410 for registering a port ID used as an identifier of each of the ports 11000 in the host computer 10000, a field 13420 for registering a MAC Address used as an identifier of a port on the network 45000, and a field 13430 for registering an iSCSI initiator name.

For example, it can be seen from FIG. 6A that a port LAN1 on the host computer has a MAC Address 11:11:11:11:11:11, and has an iSCSI initiator name of com.hitachi.sv1.

<Configuration of Volume Management Table>

FIG. 7 shows a configuration example of the volume management table 23200 provided in the storage apparatus 20000. Each of the storage apparatuses has the same volume management table.

The volume management table 23200 includes, as configuration items, a field 23210 for registering a volume ID used as an identifier of each volume in the storage apparatus, a field 23220 for registering the capacity of the each volume, a field 23230 for registering a target ID used as an identifier of an iSCSI target to which the each volume belongs, a field 23240 for registering a LUN ID used as an identifier in the iSCSI target of the each volume, and a field 23250 for storing the response time obtained in the case where an I/O operation is performed to the each volume.

For example, it can be seen from the first row (first entry) of FIG. 7 that a volume VOL1 on the storage apparatus 20000 has a storage area of 20 GB, and belongs to an iSCSI target designated by an iSCSI target ID referred to as TG1, that the volume VOL1 also has a LUN ID of 0, and that the response time at this time was 5 msec.

<Configuration of iSCSI Target Management Table>

FIG. 8 shows a configuration example of the iSCSI target management table 23300 provided in the storage apparatus 20000. The iSCSI target management table 23300 includes, as configuration items, a field 23310 for registering a target ID used as an identifier of an iSCSI target in the storage apparatus, a field 23320 for registering an iSCSI target name provided for each iSCSI target, and a field 23330 for registering an iSCSI initiator name used as an identifier of a port on the host computer, which port is permitted to access a volume belonging to the each iSCSI target.

For example, it can be seen from the first row (first entry) of FIG. 8 that the iSCSI target TG1 on the storage apparatus has an iSCSI target name of com.hitachi.sto1, and permits an access from a port having an iSCSI initiator name of com.hitachi.sv1 on a host computer (corresponding to, for example, a host computer 1) or from a port having an iSCSI initiator name of com.hitachi.sv11 on a host computer (corresponding to, for example, a host computer 11).

<Configuration of I/O Port Management Table>

FIG. 9 is shows a configuration example of the I/O port management table 23400 provided in the storage apparatus 20000.

The I/O port management table 23400 includes, as configuration items, a field 23410 for registering a port ID used as an identifier of each port in the storage apparatus, a field 23420 for registering a MAC address used as an identifier of a port on the network 45000, a field 23430 for registering a target ID used as an identifier of an iSCSI target using the port, and a field 23440 for storing an I/O amount per unit time of the each port.

For example, it can be seen from the first row (first entry) of FIG. 9 that a port PORT1 on the storage apparatus has a MAC address 22:22:22:22:22:11, and is used by iSCSI targets designated by iSCSI target IDs referred to as TG1 (corresponding to VOL1 and VOL2), and TG2 (corresponding to VOL3 and VOL4), and that the I/O amount per unit time is 300 IOPS. The PORT1 is used when accessing TG1 and TG2.

<Configuration of Controller Management Table>

FIG. 10 shows a configuration example of the controller management table 23500 provided in the storage apparatus 20000.

The controller management table 23500 includes, as configuration item, a field 23510 for registering a controller ID used as an identifier of each controller in the storage, a field 23520 for registering a port ID used as an identifier of a port connected to the controller, and a field 23530 for registering the operation rate of the processor in the controller.

For example, it can be seen from the first row (first entry) of FIG. 10 that a controller CTL1 on the storage is connected to a port PORT1, and that the operation rate of the processor at this time is 40%.

<Configuration of Apparatus Performance Management Table>

FIG. 11 is shows a configuration example of the apparatus performance management table 32100 provided in the management server 30000.

The apparatus performance management table 32100 includes, as configuration items, a field 32110 for registering an apparatus ID used as an identifier of a management target apparatus, a field 32120 for registering a device ID used as an identifier of a device in the management target apparatus, a field 32130 for storing a metric name of performance information of the management target device, a field 32140 for storing a performance value of the management target device, which value is acquired from the management target apparatus, a field 32150 for storing, upon reception of an input from the user, a threshold (alert execution threshold) which is an upper or lower limit of a normal range of the performance value of the management target device, a field 32160 for storing a threshold (measured value based threshold) upon reception of an input from the event analysis processing module 33500, a field 32170 for registering whether the threshold is the upper or lower limit of the normal value, and a field 32180 for registering whether the performance value is a normal value or an abnormal value. Note that since the field 32160 is an item used in a second embodiment, the content of the field 32160 will be described below.

For example, it can be seen from the first row (first entry) of FIG. 11 that the current operation rate of the processor of a controller CTL1 in a storage apparatus SYS1 is 40% (see 32140), that when the operation rate of the controller CTL1 exceeds 20% (see 32150), the management server determines that the controller CTL1 is overloaded, and that this performance value is determined as an abnormal value in the present example (see 32180).

Note that the I/O amount per unit time and the operation rate are listed as examples of the performance value of the device managed by the management server, but the other performance value managed by the management server may also be used.

<Configuration of Volume Topology Management Table>

FIG. 12 shows a configuration example of the volume topology management table 32200 provided in the management server 30000.

The volume topology management table 32200 includes, as configuration items, a field 32210 for registering an apparatus ID used as an identifier of a storage apparatus, a field 32220 for registering a volume ID used as an identifier of a volume provided in the storage apparatus, a field 32230 for registering a port ID used as an identifier of a port used in the case where the volume performs communication with the host computer 10000, a field 32240 for registering an ID of a controller used in the case where communication is performed between the port and the volume, a field 32250 for registering an identifier of the host computer 10000 connected to the volume, a field 32260 for registering a drive name of a logical volume of the host computer 10000, by which name the volume is recognized as an actual device, and a field 32270 for registering a port ID of the host computer, which is used as an identifier of the port used in the case where the host computer is connected to the storage apparatus.

For example, it can be seen from the first row (first entry) of FIG. 12 that a volume VOL1 of a storage apparatus SYS1 is connected to a host computer HOST1 via a storage side port designated by PORT1, a controller designated by CTL1, and a host side port designated by LAN1, so as to be recognized as a logical volume (E:) on the host.

<Configuration of Event Management Table>

FIG. 13 shows a configuration example of the event management table 33700 provided in the management server 30000. This event management table 33700 is suitably referred to in the fault cause analysis processing, the threshold relaxation processing, the threshold tightening processing, and the threshold re-calculation processing, each of which will be described below.

The event management table 33700 includes, as configuration items, a field 33710 for registering an apparatus ID used as an identifier of an apparatus in which an event, such as a threshold-based abnormality related to an acquired performance value, is generated, a field 33720 for registering an identifier of a portion in the apparatus in which portion the event is generated, a field 33730 for registering the name of a metric whose threshold is used to detect the abnormality, a field 33740 for registering the state of the portion in the apparatus at the time of generation of the event, and a field 33750 for registering the date and time of generation of the event.

For example, it can be seen from the first row (first entry) of FIG. 13 that the management server 30000 detected, in a controller designated by CTL1 in the storage apparatus SYS1, a threshold-based abnormality related to the processor operation rate. Note that it may also be configured such that a case where an abnormal state is changed into a normal state is registered as an event.

<Configuration of General Rule>

FIG. 14A and FIG. 14B show configuration examples of general-purpose rules in the general-purpose rule repository 33800 provided in the management server 30000. Generally, an event propagation model for specifying a root cause in the fault analysis is configured such that a combination of events estimated to be generated due to a fault and a root cause of the fault are described in an "IF-THEN" form. Note that the general-purpose rules are not limited to those as listed in FIG. 14A and Figure B, but more other rules may be used.

The general-purpose rule includes, as configuration items, a field 33830 for registering a general-purpose ID used as an identifier of the general-purpose rule, a field 33810 which corresponds to the IF portion of the general-purpose rule described in the "IF-THEN" form and in which an observation event is registered, a field 33820 which corresponds to the THEN portion of the general-purpose rule described in the "IF-THEN" form and in which a cause event is registered, and a field 33840 for registering a topology which is acquired at the time when the general-purpose rule is expanded to an actual system to generate an expansion rule. The general-purpose rule is based on the relationship that when the state of the conclusion portion becomes normal, the problem of the condition portion is also solved.

For example, it can be seen from FIG. 14A that, when detecting, as observation events, a threshold-based abnormality related to the response time of the logical volume on the host computer (related event), and a threshold-based abnormality related to the processor use rate in the controller of the storage apparatus (cause event), the general-purpose rule designated by the general-purpose rule ID of Rule 1 concludes that the threshold-based abnormality related to the processor use rate in the controller of the storage apparatus is the root cause. Further, when an expansion rule is generated, the topology information is acquired from the volume topology management table.

Note that a state, in which a certain condition is normal, may also be defined as an event included in the observation events. In the general-purpose rule shown in FIG. 14B, a state in which the processor use rate in the controller of the storage apparatus is normal is defined as an observation event.

<Configuration of Expansion Rule>

FIG. 15A to FIG. 15D show configuration examples of expansion rules in the expansion rule repository 33900 provided in the management server 30000. These expansion rules are generated by inserting the item of each of the entries in the volume topology management table (FIG. 12) into the general-purpose rule (FIG. 14A and FIG. 14B).

The expansion rule includes, as configuration items, a field 33930 for registering an expansion rule ID used as an identifier of the expansion rule, a field 33940 for registering a general-purpose rule ID used as an identifier of the general-purpose rule on which the expansion rule is based, a field 33910 for registering an observation event, which corresponds to the IF portion of the expansion rule described in the "IF-THEN" form, and a field 33920 for registering a cause event, which corresponds to the THEN portion of the expansion rule described in the "IF-THEN" form.

For example, the expansion rule shown in FIG. 15A is generated by respectively inserting the controller name 32240, the host ID 32250, and the connection destination drive name 32260 of the first entry shown in FIG. 12 into the apparatus class and the class of the apparatus portion in the general-purpose rule designated by the general-purpose rule ID of Rule 1. Further, it can be seed from FIG. 15A that the expansion rule designated by the expansion rule ID of ExRule1-1 is expanded on the basis of the general-purpose rule designated by the general-purpose rule ID of Rule1, and that when a threshold-based abnormality related to the response time of the logical volume on the host computer and a threshold-based abnormality related to the processor use rate in the controller of the storage apparatus are detected, the threshold-based abnormality related to the processor use rate in the controller of the storage apparatus is concluded as the root cause.

<Configuration, and the Like, of Other Control Tables>

Configuration examples of the analysis result management table 34000, the threshold correction priority management table 34100, and the threshold correction rate management table 34200 will be described below.

<Acquisition Processing of Configuration Management Information, and Update Processing of Volume Topology Management Table>

The program control module 33100 instructs the information acquisition module 33200 to periodically acquire configuration management information from the storage apparatus 20000, the host computer 10000, and the IP switch 40000 in the computer system.

The configuration management information acquisition module 33200 acquires the configuration management information from the storage apparatus 20000, the host computer 10000, and the IP switch 40000, to store the acquired information in the acquired information repository 32000, and also updates the volume topology management table 32200.

The update processing of the volume topology management table 32200 is performed as follows. First, with reference to the volume management table 23200 stored in the acquired information repository 32000, the information acquisition module 33200 checks the name of an iSCSI target which is to be connected to the volume, and the name of an iSCSI initiator which can access the volume. Next, with reference to the logical volume management table 13300, the information acquisition module 33200 connects the volume to the storage side port having the checked iSCSI target name by using the initiator having the same name as the checked name of the iSCSI initiator which can access the volume. Then, when detecting a pair of the volume in the storage and the logical volume in the host which have the same LUN ID, the information acquisition module 33200 registers, as mutually connected volumes, the pair of the volumes in the volume topology management table 32200.

<General Apparatus Performance Information Acquisition Processing and Event Analysis Processing>

Figure 16:
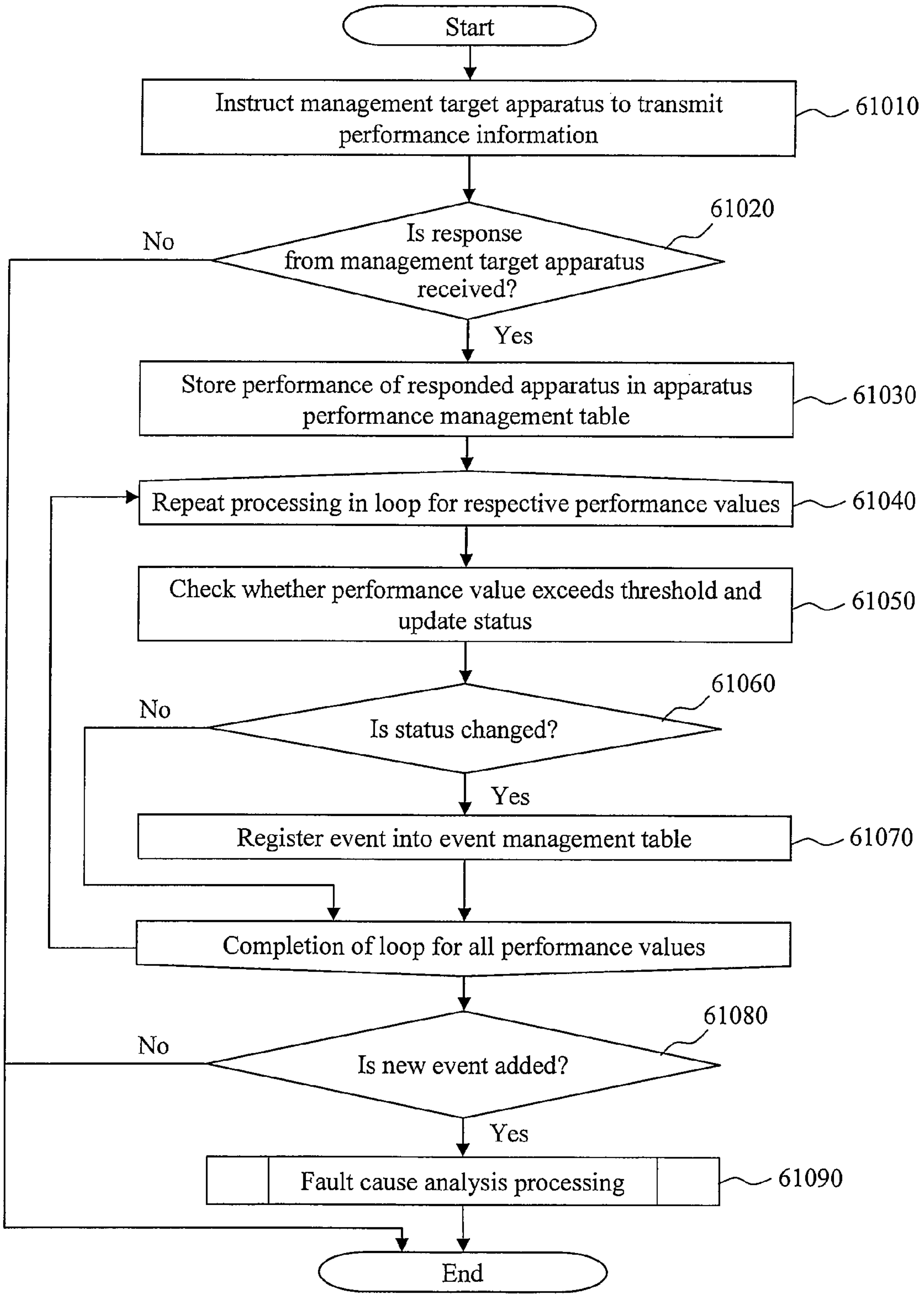
FIG. 16 is a flow chart for explaining performance information acquisition processing as a whole, which is normally performed by the management server.

FIG. 16 is a flow chart for explaining normal apparatus performance information acquisition processing performed by the apparatus performance acquisition module 33300 of the management server 30000. The program control module 33100 instructs the apparatus performance acquisition module 33300 to perform apparatus performance information acquisition processing at the time of starting the program or each time a fixed time elapses from the last apparatus performance information acquisition processing. Note that when the instruction to perform the processing is repeatedly issued, the instruction need not be strictly periodically issued, but may only be repeatedly issued.

The apparatus performance information acquisition module 33300 repeatedly performs the following series of processing to each monitoring target apparatus.

First, the apparatus performance information acquisition module 33300 instructs each monitoring target apparatus to transmit configuration management information (step 61010).

The apparatus performance information acquisition module determines whether or not there is a response from the monitoring target apparatus (step 61020). When there is a response of apparatus performance information from the monitoring target apparatus (Yes in step 61020), the apparatus performance information acquisition module stores the acquired apparatus performance information in the apparatus performance management table 32100 (step 61030). When there is no response of configuration management information from the monitoring target apparatus (No in step 61020), the apparatus performance information acquisition module ends the configuration management information acquisition processing.

Next, with reference to the apparatus performance information stored in the apparatus performance management table 32100, the apparatus performance acquisition module 33300 repeats the processing from step 61050 to step 61070 for each of the performance values (step 61040). The apparatus performance acquisition module 33300 checks whether or not the performance value exceeds the threshold, and updates the state registered in the apparatus performance management table 32100 (step 61050). Then, the apparatus performance acquisition module 33300 determines whether or not the state is changed from a normal state to a threshold-based abnormal state, or whether or not the state is changed from a threshold-based abnormal state to a normal state (step 61060). When the state is changed (Yes in step 61060), the apparatus performance acquisition module 33300 registers the event in the event management table 33700 (step 61070). When the state is not changed (No in step 61060), and when the state check processing for all the performance values is not completed, the apparatus performance acquisition module 33300 returns to the processing in step 61050.

After completing the above described processing for all the performance values, the apparatus performance acquisition module 33300 determines whether or not there is a newly added event during the series of the processing (step 61080). When there is a newly added event (for example, when a new abnormality is generated during the processing), the apparatus performance acquisition module 33300 instructs the event analysis processing module 33500 to perform the fault cause analysis processing shown in FIG. 17 (step 61090).

The above is the apparatus performance information acquisition processing which is performed by the apparatus performance acquisition module 33300.

Figure 17:
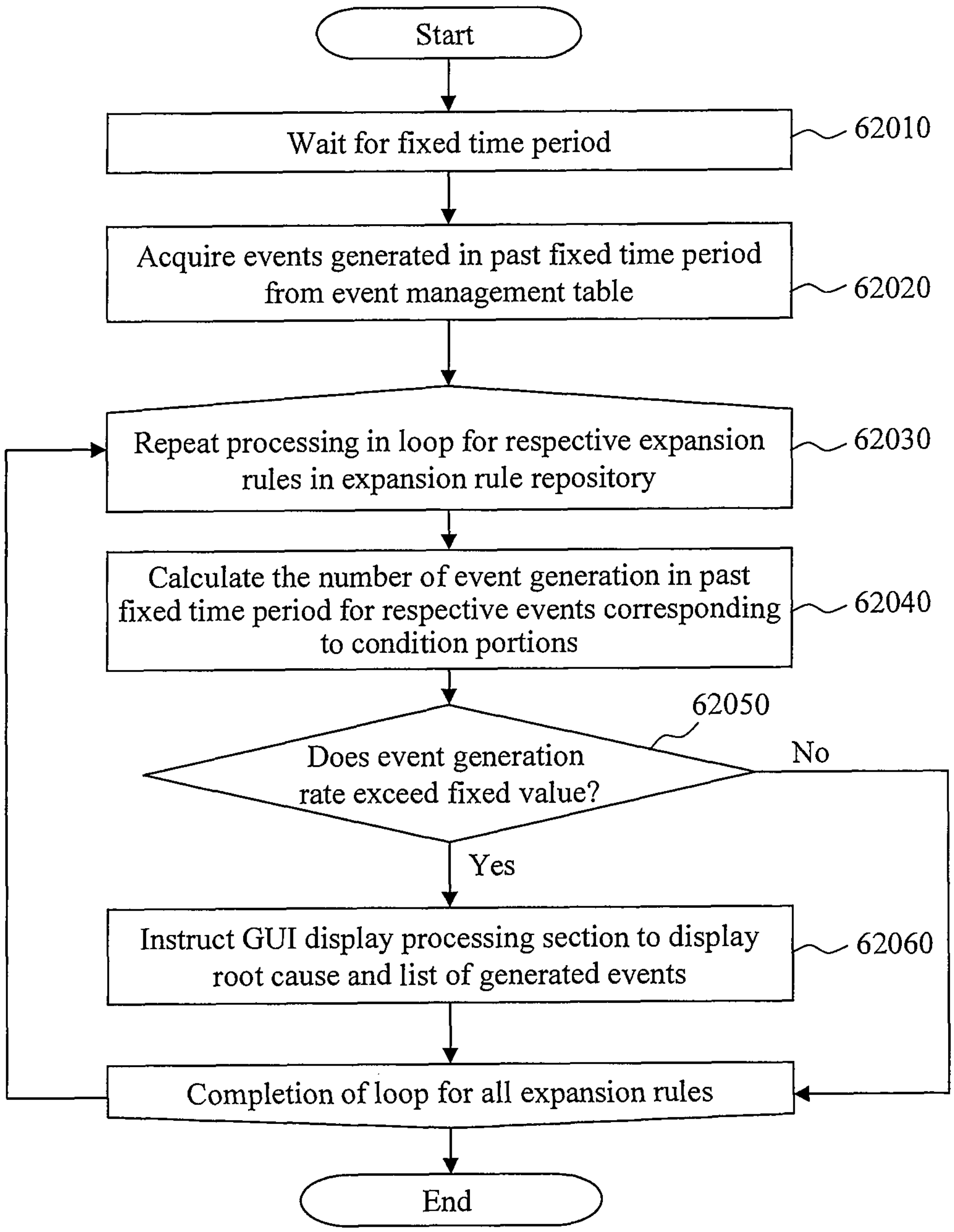
FIG. 17 is a flow chart for explaining fault analysis processing as a whole, which is normally performed by the management server.

FIG. 17 is a flow chart for explaining the details of the normal fault cause analysis processing (step 61090 of FIG. 16) which is performed by the event analysis processing module 33500 of the management server 30000.

After standing by for a fixed time period to wait for reception of an event generated later than the first event (step 62010), the event analysis processing module 33500 acquires, from the event management table 33700, events generated in the past fixed time period (step 62020).

Next, the event analysis processing module 33500 repeatedly performs the processing from step 62040 to step 62060 to each of the expansion rules in the expansion rule repository 33900 (step 62030). The event analysis processing module 33500 first calculates the number of events each of which corresponds to the condition portion described in the expansion rule and which were generated in the past fixed time period (step 62040). However, the event analysis processing module 33500 does not count, as the number of generated events, a generated event whose latest state is “normal.” Then, the event analysis processing module 33500 determines whether or not the number of generated events collected in the processing of step 62040 exceeds a fixed rate with respect to all the events described in the condition portions (step 62050). When determining that the number of generated events exceeds the fixed rate (Yes in step 62050), the event analysis processing module 33500 instructs the GUI display processing module 33400 to display an event estimated as the root cause together with the generation rate of the events corresponding to the condition sentence (step 62060), and then ends the processing.

For example, in the condition portions of the expansion rule ExRule1-1 shown in FIG. 15A, a "threshold-based abnormality related to the response time of the logical volume (E:) in the host computer HOST1" and a "threshold-based abnormality related to the operation rate of the controller CTL1 in the storage apparatus SYS1" are defined.

Then, when the "threshold-based abnormality related to the operation rate of the controller CTL1 in the storage apparatus SYS1" (generation date and time: 2010-01-01-16:00:00) is registered in the event management table 33700 shown in FIG. 13, the event analysis processing module 33500 stands by for a fixed time period, and then acquires the events generated in the past fixed time period, with reference to the event management table 33700.

Next, the event analysis processing module 33500 calculates the number of generated events which corresponds to the condition portions described in the expansion rule ExRule1-1 in the expansion rule repository 33900 and which were generated in the past fixed time period. As a result, the "threshold-based abnormality related to the response time of the logical volume (E:) in the host computer HOST1" (related event) has not been generated in the past fixed time period, and hence the rate of the number of events (cause event and related event) each of which corresponds to the condition portion of the expansion rule ExRule1-1 and which were generated in the past fixed period, with respect to the total number of events described in the condition portions is ½ (the numerator is 1 because the cause event was generated but no related event was generated).

When the rate calculated as described above exceeds a fixed value, the event analysis processing module 33500 instructs the GUI display processing module 33400 to display the event estimated as the root cause, together with the generation rate of the events corresponding to the condition sentence. When the fixed value here is set to, for example, 80%, the generation rate of respective events corresponding to the condition sentence of the rule ExRule1-1 in the past fixed time period is ½, that is, 50% in this specific example, and hence no event is displayed in the GUI.

The above described processing is performed to all the expansion rules defined in the expansion rule repository 33900.

The above is the fault cause analysis processing performed by the event analysis processing module 33500.

However, in the above described fault cause analysis processing, in the case where a threshold for detecting one threshold-based abnormal event, which is defined in the expansion rule, is excessively low as compared with the original performance of the apparatus, the event of abnormal performance of the apparatus is generated, but the other abnormal event is not generated. On the contrary, in the case where a threshold for detecting one threshold-based abnormal event, which is defined in the expansion rule, is excessively high as compared with the original performance of the apparatus, the event of the performance abnormality of the apparatus is not generated, but the other threshold-based abnormal event, which is defined in the expansion rule, is generated.

Therefore, the general event analysis processing has a problem that the event described in the condition portion is not necessarily generated as intended in the processing expansion rule.

Thus, in an embodiment according to the present invention, an improved event analysis processing is provided, as threshold relaxation processing and threshold tightening processing, in order to more suitably detect the abnormal performance event.

<Contents of Threshold Relaxation Processing>

First, an analysis result management table (FIG. 18), a threshold correction priority management table (FIG. 19), and a threshold correction rate management table (FIG. 20), which are newly introduced in the present invention, will be described, and then the threshold relaxation processing and the threshold tightening processing will be described.

(i) Configuration of Analysis Result Management Table

FIG. 18 shows a configuration example of the analysis result management table 34000 provided in the management server 30000.

The analysis result management table 34000 includes, as configuration items, a field 34010 for registering an apparatus ID used as an identifier of an apparatus in which an event determined as a root cause in the fault cause analysis processing is generated, a field 34020 for registering an identifier of a portion in the apparatus, at which portion the event is generated, a field 34030 for registering the name of a metric used to detect the threshold-based abnormality, a field 34040 for registering an ID of an expansion rule on the basis of which the event is determined as the root cause, a field 34050 for registering the presence of generation of the event determined as the root cause among the events described in the condition portions of the expansion rule, a field 34060 for registering the generation rate of the events (related events) other than the event determined as the root cause, a field 34070 for registering the performance value at the time of generation of the event, and a field 34080 for registering the date and time of the start of the fault analysis processing according to the generation of the event.

For example, it can be seen from the first row (first entry) of FIG. 18 that on the basis of the expansion rule ExRule1-1, the management server 30000 has determined, as the root cause, the threshold-based abnormality related to the processor operation rate in the controller designated by CTL1 in the storage apparatus SYS1, and that the generation rate of the other condition events (related events) at this time is 0/1 (that is, the abnormality in the response time of the drive E of the HOST1 is not generated).

(ii) Configuration of Threshold Priority Management Table

FIG. 19 shows a configuration example of the threshold correction priority management table 34100 provided in the management server 30000.

The threshold correction priority management table 34100 includes, as configuration items, a field 34110 for registering the class of an apparatus managed by the management server 30000, a field 34120 for registering a portion in the apparatus whose performance information is to be acquired among the management target apparatuses, a field 34130 for registering the name of a metric which is acquired from the management target apparatus, and a field 34140 for registering the priority on the basis of which the threshold for the metric is corrected.

For example, it can be seen from FIG. 19 that the management server 30000 monitors the processor operation rate of each controller in each of the storage apparatuses, and that the threshold value change priority is 1 in this case.

Note that the analysis result management table (FIG. 18) is created for a device with the highest priority in the condition portion of the expansion rule. Therefore, for example, in the case of the expansion rule ExRule1-1, the priority of the controller CTL1 is set higher than the priority of the disk drive E, and hence the analysis result management table is created only for the controller CTL1.

(iii) Configuration of Threshold Correction Rate Management Table

FIG. 20 shows a configuration example of the threshold correction rate management table 34200 provided in the management server 30000. The threshold correction rate management table 34200 is configured by a field 34210 for registering the class of apparatus managed by the management server, a field 34220 for registering a portion in the apparatus whose performance information is to be acquired among the management target apparatuses, a field 34230 for registering the name of a metric which is acquired from the apparatus, a field 34240 for registering a condition on the basis of which the threshold for the metric is corrected, and a field 34250 for registering the change rate of the threshold for the metric at the time of correction of the threshold.

For example, it can be seen from FIG. 20 that the management server 30000 monitors the processor operation rate of each controller in each of the storage apparatuses, and that the change rate at the time of increasing or decreasing the threshold is 2%.

(iv) Fault Cause Analysis Processing

Figure 21:
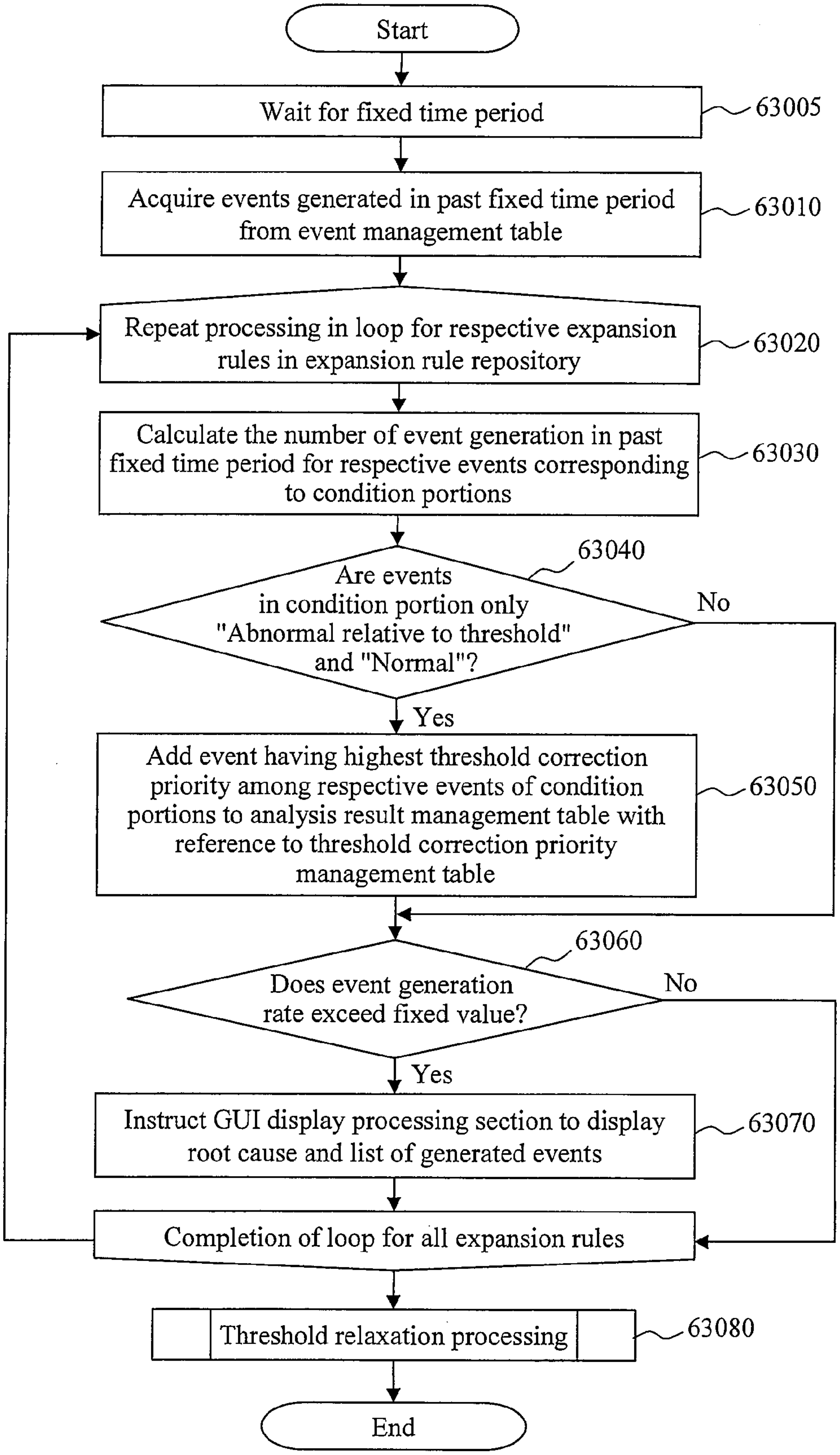
FIG. 21 is a flow chart for explaining improved fault analysis processing as a whole, which is performed by the management server in a first embodiment according to the present invention.

FIG. 21 is a flow chart for explaining the fault cause analysis processing performed by the event analysis processing module 33500 of the management server 30000 according to the first embodiment.

The event analysis processing module 33500 stands by for a fixed time period to wait for reception of an event generated later than the first event (step 63005). Then, the event analysis processing module 33500 acquires, from the management table 33700, the events generated in the past fixed time period (step 63010).

Next, the event analysis processing module 33500 repeatedly performs the processing from step 63030 to step 63070 to each of the expansion rules in the expansion rule repository 33900 (step 63020).

In the repetition processing, the event analysis processing module 33500 first calculates the number of the respective events which correspond to the condition portions and which were generated in the past fixed time period (step 63030). Then, the event analysis processing module 33500 determines whether or not the event status of each of the condition portions of the expansion rule is a "threshold-based abnormal status" or a "normal status" (step 63040). The status of "fault" may be caused, but the fault status is eliminated in this step.

In the case where the event statuses of the condition portions were only the "threshold-based abnormal status" and "normal status" (Yes in step 63040), with reference to the threshold correction priority management table 34100, the event analysis processing module 33500 selects an event having the highest threshold correction priority from the events respectively corresponding to the condition portions described in the expansion rule. Further, the event analysis processing module 33500 adds the apparatus ID, the portion ID, and the name of metric, which correspond to the event having the highest threshold correction priority, to the fields 34010, 34020 and 34030 of the analysis result management table 34000, respectively. Further, the event analysis processing module 33500 respectively adds the event generation status, and the performance value at the time of generation of the event to the fields 34050 and 34070, and also respectively adds the expansion rule ID and the analysis start date and time to the fields 34040 and 34080. Further, the event analysis processing module 33500 calculates the generation rate of the respective events defined in the condition portions other than the event having the highest threshold correction priority, and adds the calculation result to the field 34060 of the analysis result management table 34000 (step 63050). However, among the events described in the condition portions, the event of "normal" status is not taken as the object of the calculation.

Next, the event analysis processing module 33500 determines whether or not the number of generated events collected in step 63030 exceeds a fixed rate with respect to all the events described in the condition portions (step 63060: the same processing as in step 62050 of FIG. 17). When the number of generated events exceeds the fixed rate (Yes in step 63060), the event analysis processing module 33500 instructs the GUI display processing module 33400 to display the event estimated as the root cause together with the generation rate of events corresponding to the condition sentence (step 63070).

The event analysis processing module 33500 performs the above described processing to all the expansion rules, and thereafter performs the threshold relaxation processing as will be described below (63080).

(v) Details of Threshold Relaxation Processing

Figure 22:
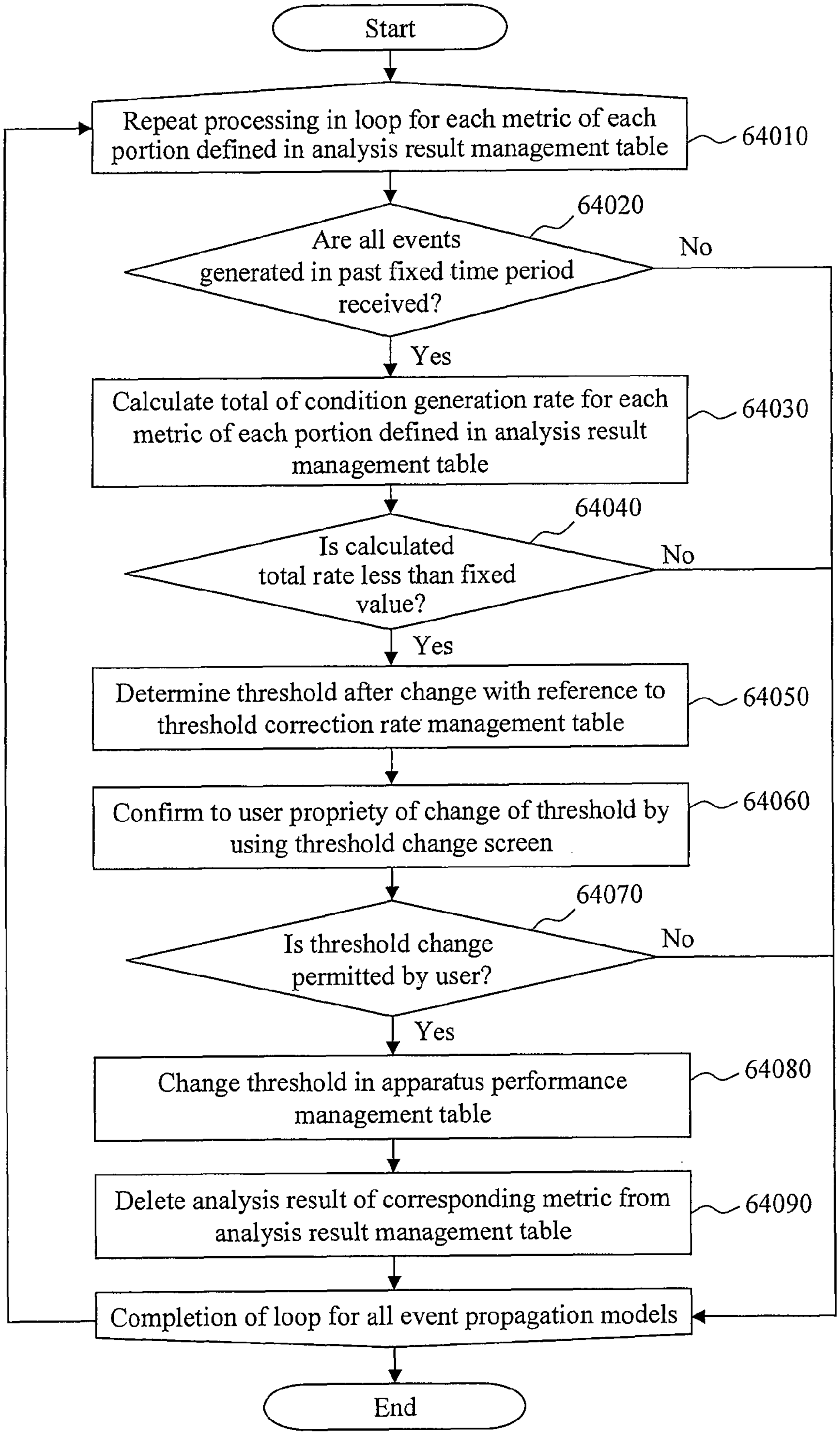
FIG. 22 is a flow chart for explaining threshold relaxation processing as a whole, which is performed by the management server in the first embodiment.

FIG. 22 is a flow chart for explaining the details of the threshold relaxation processing (step 63080) performed by the event analysis processing module 33500 of the management server 30000. This processing is performed during the fault cause analysis processing shown in FIG. 21. However, this processing may also be performed according to an instruction from the manager.

With reference to the analysis result management table 34000, the event analysis processing module 33500 repeatedly performs the processing from step 64020 to step 64090 to each metric of the respective portions defined in the analysis result management table (step 64010).

First, the event analysis processing module 33500 checks whether or not all the threshold-based abnormal events related to each of the metrics of the respective portions are received for all the analysis results in the past fixed time period (step 64020). When all the threshold-based abnormal events are not received (No in step 64020), the event analysis processing module 33500 shifts to the processing about the next metric. When all the threshold-based abnormal events are received (Yes in step 64020), the event analysis processing module 33500 calculates the total of the condition generation rate for each metric of the respective portions, which metric is defined in the analysis result management table 34000 and is a threshold correction target (step 64030).

Next, the event analysis processing module 33500 checks whether or not the calculated total condition generation rate is less than a fixed value (step 64040). When the calculated total condition generation rate is not less than the fixed value (No in step 64040), the event analysis processing module 33500 shifts to the processing about the next metric. When the total condition generation rate is less than the fixed value (Yes in step 64040), the event analysis processing module 33500 determines a threshold value after correction, with reference to the threshold correction ratio management table 34200 (step 64050). At this time, the event analysis processing module 33500 uses a change rate of the correction class designated as "increase."

Next, the event analysis processing module 33500 displays, on the GUI screen, the threshold calculated in the above described processing. Then, the event analysis processing module 33500 receives, from the user, an instruction about whether or not the threshold can be changed, and checks whether or not the threshold is to be changed (step 64060).

When receiving, from the user, the instruction of permission to change the threshold (Yes in step 64070), the event analysis processing module 33500 changes the threshold of the apparatus performance management table 32100 into the calculated value (step 64080). Further, the event analysis processing module 33500 deletes the analysis result about the corresponding metric from the analysis result management table 34000 (step 64090). Note that it may also be configured such that the threshold correction processing is performed without checking the user's permission to change the threshold.

The above is the threshold relaxation processing which is performed by the event analysis processing module 33500.

Subsequently, specific examples of the fault cause analysis processing and the threshold relaxation processing will be described. Note that it is assumed that the analysis result management table after the processing is shown in FIG. 18, that the threshold correction priority management table is shown in FIG. 19, that the threshold correction rate management table is shown in FIG. 20, and that the expansion rule ExRule1-1 is shown in FIG. 15A.

When the "threshold-based abnormality related to the operation rate of the controller CTL1 in the storage apparatus SYS1" (generation date and time: 2010-01-01-16:00:00) is registered in the event management table 33700 shown in FIG. 13, the event analysis processing module 33500 waits for a fixed time period and then acquires the events generated in the past fixed time period with reference to the event management table 33700.

Next, with reference to the threshold correction priority management table 34100, the event analysis processing module 33500 selects an event having the highest threshold correction priority from the events respectively corresponding to the condition portions described in the expansion rule ExRule1-1. In the expansion rule ExRule1-1, the threshold correction priority of "operation rate of the controller CTL1 in the storage apparatus SYS1" is highest. The threshold-based abnormal event related to the "operation rate of the controller CTL1 in the storage apparatus SYS1" has already been generated in the past fixed time period. On the other hand, the other event defined in the condition portion is only the "threshold-based abnormality related to the response time of the logical volume (E:) in the host computer HOST1," and has not been generated in the past fixed time period. Therefore, the generation rate of the events respectively defined in the other condition portions becomes $0/1$. The above results are added to the calculation analysis result management table.

With reference to the analysis result management table 34000, the event analysis processing module 33500 checks whether or not the threshold-based abnormal event related to the "operation rate of the controller CTL1 in the storage apparatus SYS1" has been received. Since the threshold-based abnormal event related to the "operation rate of the controller CTL1 in the storage apparatus SYS1" has already been received, the event analysis processing module 33500 calculates the total of the generation rate of events respectively defined in the condition portions corresponding to the "operation rate of the controller CTL1 in the storage apparatus SYS1." As a result of the calculation, the total of generation rate is obtained as $0/4$.

Then, since the calculated total generation rate is less than a fixed value, the event analysis processing module 33500 determines the threshold value after correction, with reference to the threshold correction priority management table 34100 and the threshold correction rate management table 34200. It is defined in the threshold correction rate management table 34200 that the threshold related to the "operation rate of the controller CTL1 in the storage apparatus SYS1" is to be corrected to increase by 2%. Thus, the new threshold value is set to 20.4%.

The event analysis processing module 33500 displays, on the GUI screen, the threshold calculated by the above processing, and confirms to the user whether or not the threshold can be changed. When the change of the threshold is permitted by the user, the event analysis processing module 33500 changes the threshold in the apparatus performance management table into the calculated value.

With the above processing, the threshold in the apparatus performance management table, which threshold relates to "the operation rate of the controller CTL1 in the storage apparatus SYS1," is updated in the increasing direction.

Note that in the threshold relaxation processing performed by the event analysis processing module 33500, the event analysis processing module 33500 may also refer to the configuration information of the managed apparatuses, which information is held in the acquired information repository 32000, so as to thereby collectively perform the threshold relaxation processing to the components having the same performance as the performance of the component in the apparatus, the threshold of which component is to be reset. For example, in the case where the disks 24200 to 24210, which configure the RAID group 24000 of the storage apparatus 20000, are the same type and have the same performance characteristics, the event analysis processing module 33500 may perform the threshold reset processing for a metric of the disk 24200 simultaneously with the threshold reset processing for the same metric of the disk 24210.

<Configuration of Threshold Value Correction Screen>

Figure 23:
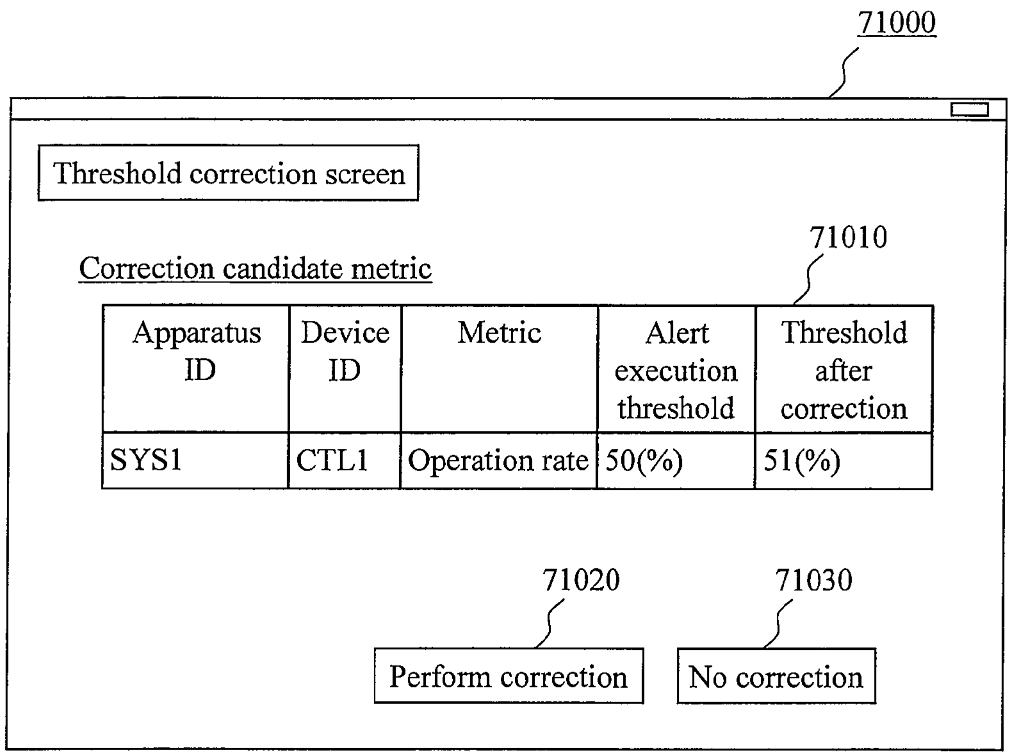
FIG. 23 shows a configuration example of a threshold correction screen displayed by the management server.

FIG. 23 shows a display example of a threshold correction screen displayed by the management server 30000.

In a threshold value correction screen 71000, a class of an apparatus to which the correction processing is to be performed, a class of a component in the apparatus, a metric and threshold before and after the correction are displayed (table 71010). Then, when a "change" button (button 71020) is depressed by the user, the change of the threshold is permitted. When a "no change" button (button 71030) is depressed by the user, the change of the threshold is not permitted, and the threshold correction is not performed.

<Effect of Threshold Relaxation Processing>

As described above, the system management software performs the threshold relaxation processing on the basis of the event hit state in the expansion rule which is used for the performance fault analysis based on the fault cause analysis function of the software itself. Then, the system management software corrects, in the increasing direction, the threshold set low as compared with the original performance of the apparatus. As a result, the threshold given to the managed component is made to match with the performance capacity of the component, so that a warning can be accurately issued to the manager by the management software.

<Details of Threshold Tightening Processing>

Figure 24:
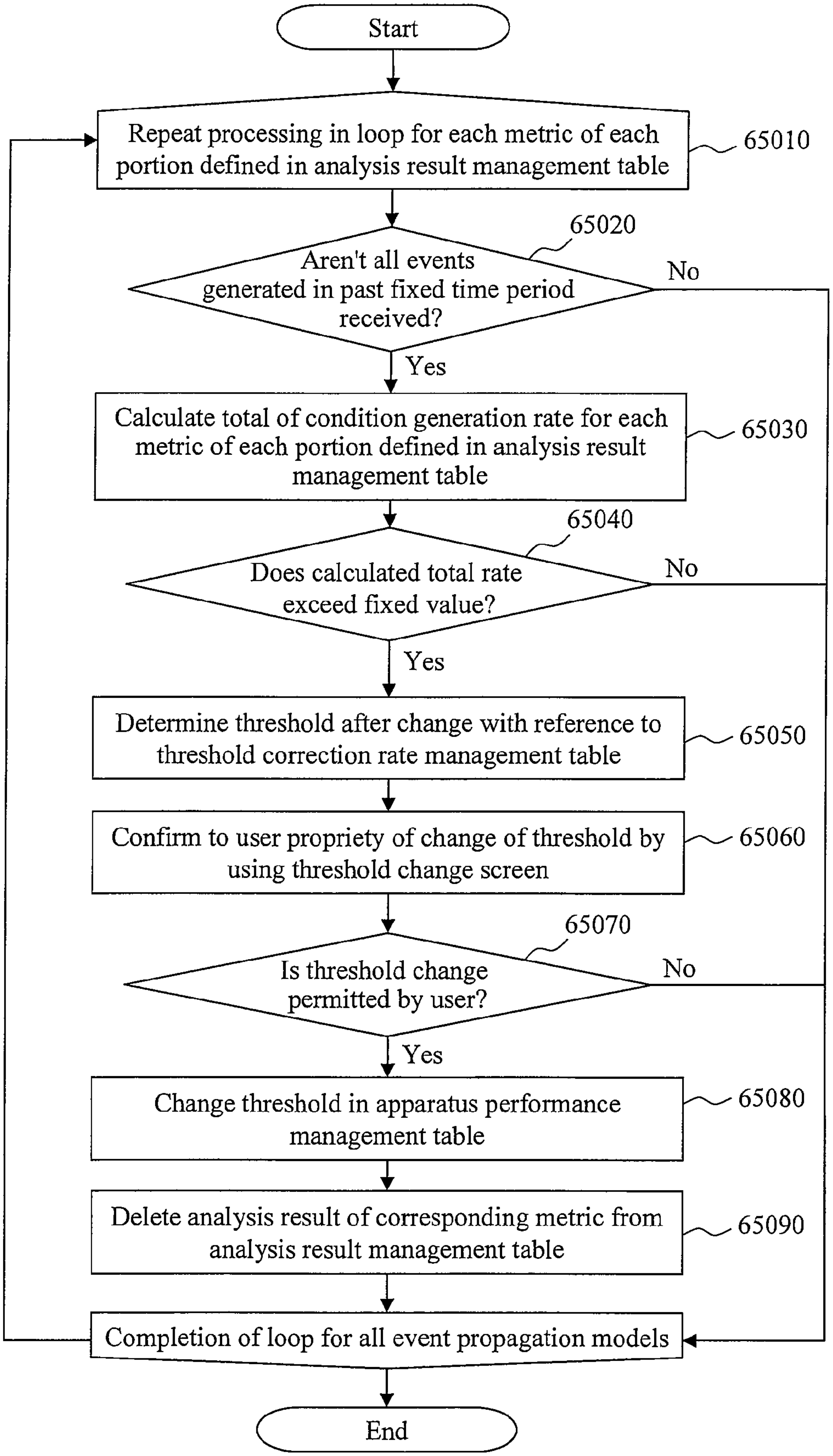
FIG. 24 is a flow chart for explaining threshold tightening processing as a whole, which is performed by the management server in the first embodiment according to the present invention.

FIG. 24 is a flow chart for explaining the threshold tightening processing performed by the event analysis processing module 33500 according to the first embodiment of the present invention. Note that the management information provided in the management server 30000 is not different from the information used in the threshold relaxation processing. The threshold tightening processing is performed after the execution of the threshold relaxation processing shown in FIG. 22. However, the threshold tightening processing may be performed by an instruction from the manager.

With reference to the analysis result management table 34000, the event analysis processing module 33500 repeatedly performs processing from step 65020 to step 65090 to the correction target metrics of the respective portions defined in the analysis result management table (step 65010).

In the repetition processing, the event analysis processing module 33500 first checks, for each metric of the respective portions, whether or not no threshold-based abnormal event is received for all the analysis results in the past fixed time period (step 65020). That is, when at least one threshold-based abnormal event is received, the event analysis processing module 33500 shifts to the processing about the next metric.

When no threshold-based abnormal event is not received (No in step 65020), the event analysis processing module 33500 shifts to the processing about the next metric. When no threshold-based abnormal event is received (Yes in step 65020), the event analysis processing module 33500 calculates the total of condition generation rate of each metric of the respective portions, which metric is defined as a target of threshold correction in the analysis result management table 34000 (step 65030). Next, the event analysis processing module 33500 checks whether or not the collected total condition generation rate exceeds a fixed value (step 65040). When the collected total condition generation rate does not exceed the fixed value (No in step 65040), the event analysis processing module 33500 shifts to the processing about the next metric.

When the collected total condition generation rate exceeds the fixed value (Yes in step 65040), the event analysis processing module 33500 determines the threshold value after correction, with reference to the threshold correction ratio management table 34200 (step 65050). At this time, the correction rate of the correction class designated as "decrease" is used.

Next, the event analysis processing module 33500 displays the threshold calculated by the above described processing on the GUI screen, and confirms to the user whether or not the threshold value can be changed (step 65060).

When the instruction to permit the change of the threshold is received from the user (Yes in step 65070), the event analysis processing module 33500 changes the threshold in the apparatus performance management table 32100 to the value calculated as described above (step 65080). When the instruction not to permit the change of the threshold is received from the user (No in step 65070), the event analysis processing module 33500 shifts to the processing about the next metric. Note that it may also be configured such that the processing is performed without confirming to the user whether or not the threshold can be changed.

Then, the event analysis processing module 33500 deletes the calculation result about the corresponding metric from the analysis result management table 34000 (step 65090).

The above is the threshold tightening processing performed by the event analysis processing module 33500.

Subsequently, specific examples of the fault cause analysis processing and the threshold tightening processing will be described. Note that it is assumed that the analysis result management table after completion of the processing is shown in FIG. 18, that the threshold correction priority management table is shown in FIG. 19, that the threshold correction rate management table is shown in FIG. 20, and that the expansion rule ExRule1-4 is shown in FIG. 15D.

When a "threshold-based abnormality related to the response time of the logical volume (E:) in the host computer HOST3" (generation date and time: 2010-01-01-16:00:00) is registered in the event management table shown in FIG. 13, the event analysis processing module 33500 waits for a fixed time period, and then acquires the events generated in the past fixed time period with reference to the event management table 33700.

Then, with reference to the threshold correction priority management table 34100, the event analysis processing module 33500 selects an event having the highest threshold correction priority from the events respectively corresponding to the condition portions described in the expansion rule ExRule1-4 of the expansion rule repository 33900. In the expansion rule ExRule1-4, the event corresponding to the "operation rate of the controller CTL2 in the storage device SYS1" has the highest threshold correction priority. No threshold-based abnormal event related to the "operation rate of the controller CTL2 in the storage apparatus SYS1" has been generated in the past fixed time period. On the other hand, among the other events (related events) defined in the condition portions, one "threshold-based abnormal event related to the response time of the logical volume (E:) in the host computer HOST3" has already been generated in the past fixed time period. Therefore, the generation rate of each of the events (related events) defined in the other condition portions becomes 1/1. The event analysis processing module 33500 adds the above result to the analysis result management table 34000.

Next, with reference to the analysis result management table 34000, the event analysis processing module 33500 checks whether or not the threshold-based abnormal event related to the "operation rate of the controller CTL2 in the storage apparatus SYS1" has been received. Since the threshold-based abnormal event related to the "operation rate of the controller CTL2 in the storage apparatus SYS1" has not been received, the event analysis processing module 33500 calculates the total of the generation rate of the events which relate to the "operation rate of the controller CTL2 in the storage apparatus SYS1" and which are respectively defined in the condition portions. As a result of the calculation, the total of the generation rate of the events becomes 2/2.

Since the calculated total generation rate exceeds a fixed value, the event analysis processing module 33500 determines a threshold after correction, with reference to the apparatus performance management table 32100 and the threshold correction rate management table 34200. It is defined in the threshold correction rate management table 34200 that the "operation rate of the controller CTL2 in the storage apparatus SYS1" is corrected to be decreased by 2%. Thus, the new threshold is set to 78.4%.

Then, the event analysis processing module 33500 displays the corrected threshold on the GUI screen, to confirm to the user whether or not the threshold can be changed (see FIG. 23). When the user permits to change the threshold, the event analysis processing module 33500 changes the threshold in the apparatus performance management table 32100 into the corrected value.

With the above processing, the threshold in the apparatus performance management table, which relates to the "operation rate of the controller CTL2 in the storage apparatus SYS1," is updated to the lower level.

Note that in the threshold tightening processing, it may also be configured such that with reference to the configuration information of the managed apparatuses, which information is held in the acquired information repository 32000, the event analysis processing module 33500 collectively performs the threshold reset processing to the components having the same performance characteristics as those of the component in the apparatus, the threshold of which component is to be reset. For example, in the case where the disks 24200 to 24210, which configure the RAID group 24000 of the storage apparatus 20000, are the same type and have the same performance characteristics, the event analysis processing module 33500 may perform the threshold reset processing for a metric of the disk 24200 simultaneously with the threshold reset processing for the same metric of the disk 24210.

<Effect of Threshold Tightening Processing>

As described above, the system management software performs the threshold tightening processing on the basis of the event hit state in the expansion rule which is used to the performance fault analysis based on the fault cause analysis function of the system management software itself. Then, the system management software corrects, to the lower level, the threshold which is set higher as compared with original performance. As a result, the threshold given to the managed component is made to match with the performance capacity of the component, so that a warning can be accurately issued to the manager by the managed software.

(2) Second Embodiment

A second embodiment relates to threshold re-calculation processing performed by the management software by using a measured value based threshold. Since the system configuration and the configuration of each of the apparatuses are the same as those of the first embodiment, and hence the explanation thereof is omitted.

<Details of Threshold Re-Calculation Processing Using Measured Value Based Threshold>

In the present embodiment, in order to realize a suitable threshold setting, the management server 30000 performs threshold re-calculation processing by using a measured value based threshold. Note that the management information provided in the management server 30000 is the same as the management information of the first embodiment.

Figure 25A:
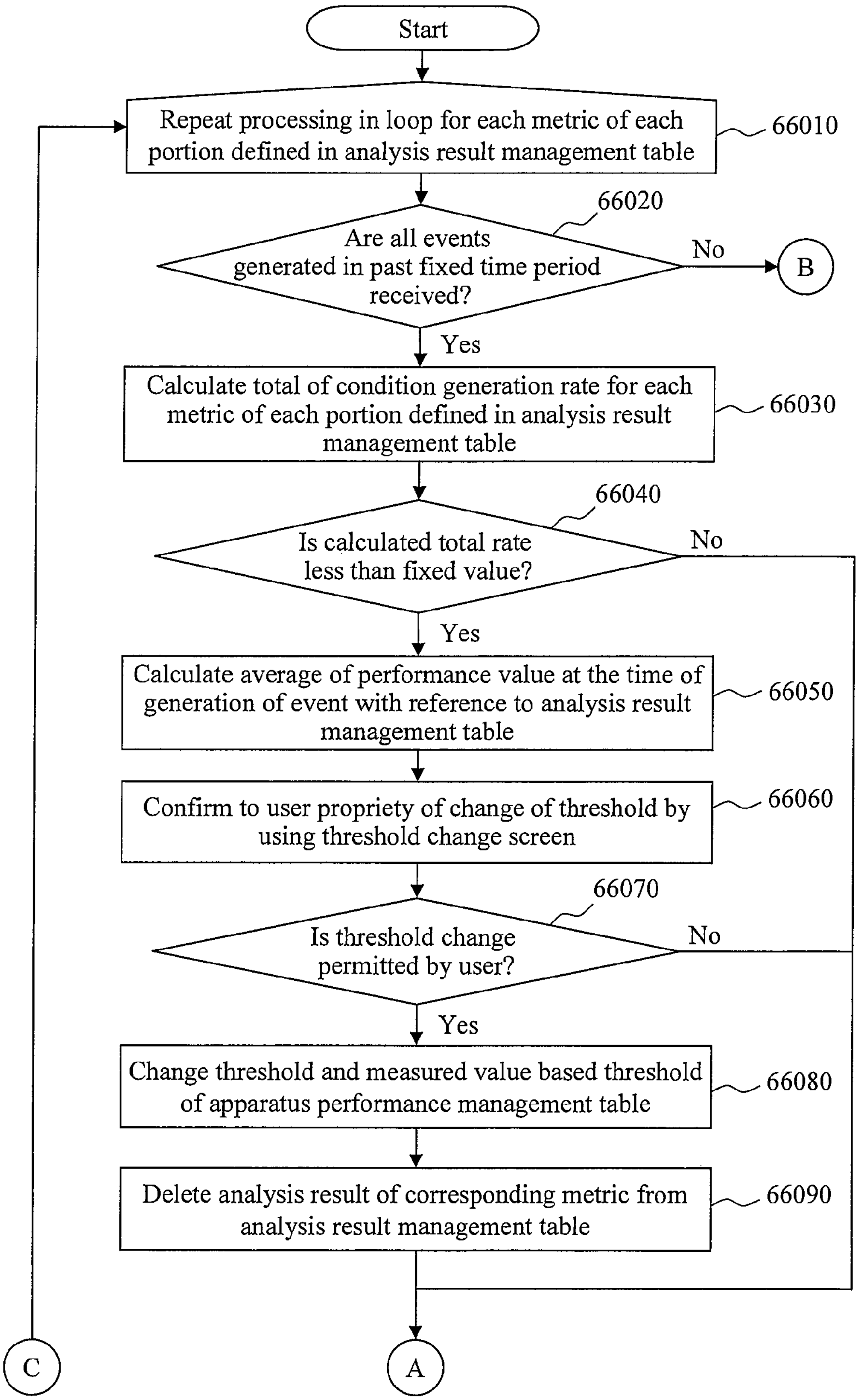
FIG. 25A is a flow chart (1) for explaining threshold reset processing as a whole, which is performed by the management server on the basis of a measured value based threshold in a second embodiment according to the present invention.
Figure 25B:
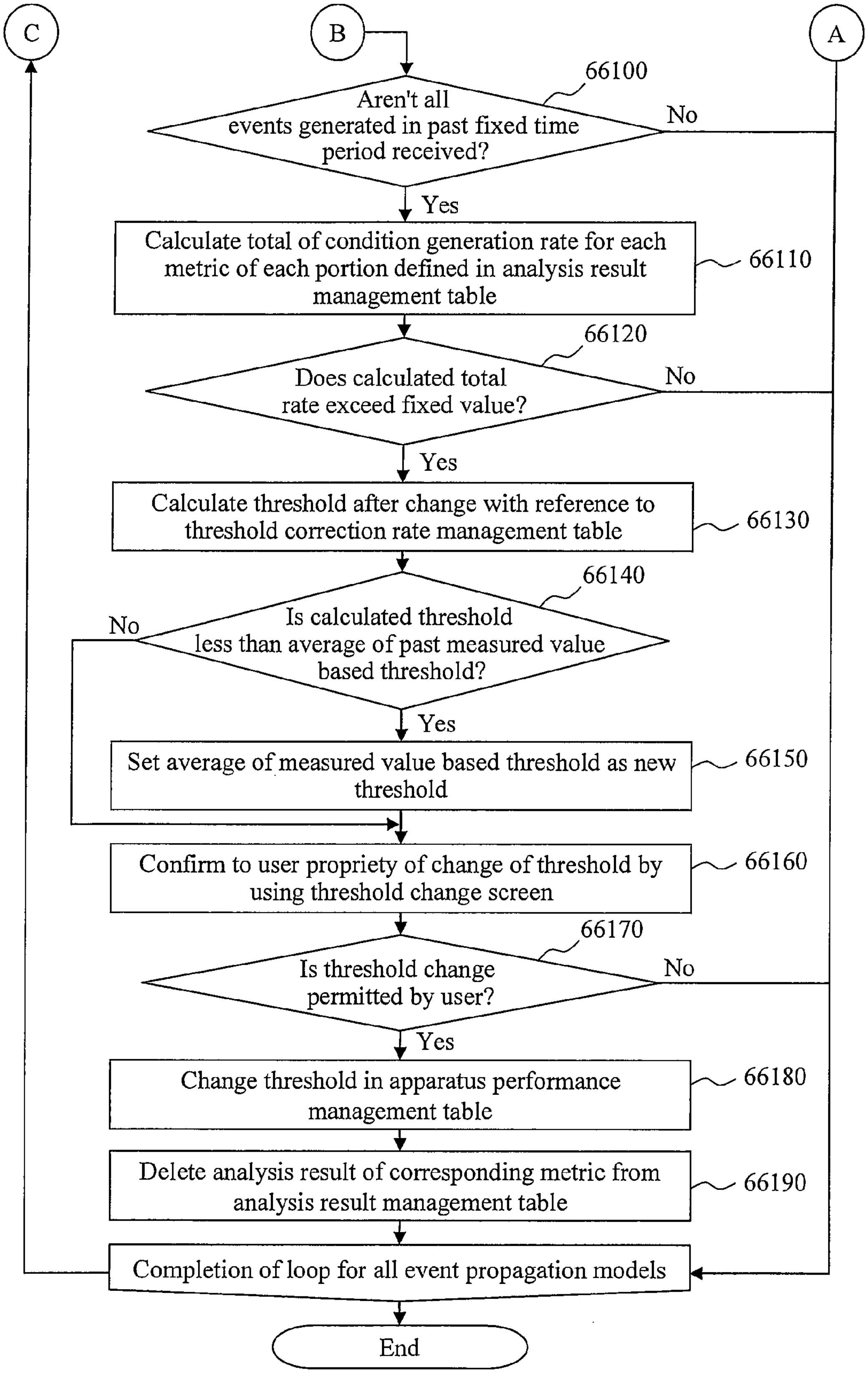
FIG. 25B is a flow chart (2) for explaining the threshold reset processing as a whole, which is performed by the management server on the basis of the measured value based threshold in the second embodiment according to the present invention.

FIG. 25 is a flow chart for explaining threshold re-calculation processing performed by the event analysis processing module 33500 of the management server 30000 in the second embodiment. This processing is performed instead of the threshold relaxation processing in the fault cause analysis processing in FIG. 22 described in the first embodiment. However, this processing may also be performed according to the manager's instruction.

With reference to the analysis result management table 34000, the event analysis processing module 33500 repeatedly performs a series of processing from step 66020 to step 66190 each metric of the portions respectively defined in the analysis result management table (step 66010).

In this repetition processing, the event analysis processing module 33500 first checks, for all the analysis results in the past fixed time period, whether or not a threshold-based abnormal event has been received for each metric of the respective portions (whether or not all the rows of the event reception 34050 of the analysis result management table 34000 are Yes) (step 66020). When no threshold-based abnormal event has been received (No in step 66020), the event analysis processing module 33500 shifts to the processing of step 66100. When a threshold-based abnormal events for all the metrics of predetermined portions have been received (Yes in step 66020), the event analysis processing module 33500 calculates the total of condition generation rate for each metric of the respective portions, which metric is defined in the analysis result management table 34000 and the threshold of which metric is to be corrected (step 66030).

Next, the event analysis processing module 33500 checks whether or not the calculated total condition generation rate is less than a fixed value (step 66040). When the calculated total condition generation rate is not less than the fixed value (No in step 66040), the event analysis processing module 33500 shifts to the processing about the next metric.

When the calculated total condition generation rate is less than the fixed value (Yes in step 66040), the event analysis processing module 33500 calculates, with reference to the analysis result management table 34000, an average of performance values at the time of generation of the threshold-based abnormal event related to the metric in the past fixed time period (step 66050).

Next, the event analysis processing module 33500 displays, on the GUI screen, the threshold (corrected value) calculated in step 66050, and confirms to the user whether or not the threshold can be changed (step 66060). At this time, the event analysis processing module 33500 presents, as the corrected threshold, the average of the performance values at the time of generation of the event.

Then, when receiving the instruction to permit the change of the threshold from the user (Yes in step 66070), the event analysis processing module 33500 changes the measured value based threshold in the apparatus performance management table 32100 into the calculated value (corrected value) (step 66080). Further, the event analysis processing module 33500 deletes the analysis result about the corresponding metric from the analysis result management table 34000 (step 66090).

On the other hand, the event analysis processing module 33500 checks, for each metric of the respective portions, whether no threshold-based abnormal event has been received in all the analysis results in the past fixed time period (whether or not all the statuses of the event reception 34050 in the analysis result management table 34000 are No) (step 66100). When no threshold-base abnormal event has not been received (No in step 66100), the event analysis processing module 33500 shifts to the processing about the next metric.

When no threshold-based abnormal event has been received in all the analysis results (Yes in step 66100), the event analysis processing module 33500 calculates the total of the condition generation rates about each metric of the respective portions, which metric is defined in the analysis result management table 34000 and the threshold for which metric is to be corrected (step 66110).

Next, the event analysis processing module 33500 checks whether or not the calculated total condition generation rate exceeds a fixed value (step 66120). When the calculated total condition generation rate does not exceed the fixed value (No in step 66120), the event analysis processing module 33500 shifts to the processing about the next metric.

When the calculated total condition generation rate exceeds the fixed value (Yes in step 66120), the event analysis processing module 33500 determines a threshold after correction with reference to the threshold correction rate management table 34200 (step 66130). At this time, the event analysis processing module 33500 uses the change rate designated by the correction class of "decrease."

Next, with reference to the apparatus performance management table 32100, the event analysis processing module 33500 checks the measured value based threshold of the corresponding metric (step 66140). When the calculated threshold is less than measured value based threshold (Yes in step 66140), the event analysis processing module 33500 sets the measured value based threshold as the new threshold (step 66150). On the other hand, when the calculated threshold is not less than measured value based threshold (No in step 66140), the event analysis processing module 33500 sets, as the new threshold, the threshold calculated in step 66130, and shifts to the processing of step 66160.

Then, the event analysis processing module 33500 displays the new threshold (the measured value based threshold or the calculated threshold) on the GUI screen, to receive, from the user, an instruction as to whether or not the threshold can be changed (step 66160).

When receiving the instruction to permit the change of the threshold from the user (Yes in step 66170), the event analysis processing module 33500 changes the threshold in the apparatus performance management table 32100 into the new threshold (step 66180). When receiving the instruction not to permit the change of the threshold from the user (No in step 66170), the event analysis processing module 33500 shifts to the processing about the next metric.

Further, the event analysis processing module 33500 deletes the analysis result about the corresponding metric from the analysis result management table 34000 (step 66190).

The above is the threshold re-calculation processing performed by the event analysis processing module 33500 by using the measured value based threshold.

Subsequently, specific examples of the fault cause analysis processing and the threshold re-calculation processing using measured value based threshold value will be described. Note that it is assumed that the analysis result management table after completion of the processing is shown in FIG. 18, that the threshold correction priority management table is shown in FIG. 19, that the threshold correction rate management table is shown in FIG. 20, and that the expansion rule ExRule1-1 is shown in FIG. 15A.

First, when a "threshold-based abnormal event related to the operation rate of the controller CTL1 in the storage apparatus SYS1" (generation date and time: 2010-01-01 16:00:00) is registered in the event management table shown in FIG. 13, the event analysis processing module 33500 waits for a fixed time period, and then acquires the events generated in the past fixed time period, with reference to the event management table.

Then, with reference to the threshold value correction priority management table 34100, the event analysis processing module 33500 selects an event having the highest threshold correction priority from the events respectively corresponding to the condition portions described in the expansion rule ExRule1-1 in the expansion rule repository 33900. In the expansion rule ExRule1-1, the event corresponding to the "operation rate of the controller CTL1 in the storage device SYS1" has the highest threshold correction priority. It is shown in the event management table 33700 that the threshold-based abnormal event related to the "operation rate of the controller CTL1 in the storage apparatus SYS1" has been generated in the past fixed time period.

On the other hand, the other event (related event) defined in the condition portions is the "threshold-based abnormal event related to the response time of the logical volume (E:) in the host computer HOST1," and the event has not been generated in the past fixed time period. Therefore, the generation rate of respective events (related events) defined in the other condition portions becomes 0/1. The event analysis processing module 33500 adds the above result to the analysis result management table 34000 (see 34060 in FIG. 18).

Next, with reference to the analysis result management table 34000, the event analysis processing module 33500 checks whether or not the threshold-based abnormal events related to all the "operation rates of the controller CTL1 in the storage apparatus SYS1" have been received. It is shown in the analysis result management table 34000 that the threshold-based abnormal events related to all the "operation rates of the controller CTL1 in the storage apparatus SYS1" have been received. Thus, the event analysis processing module 33500 calculates the total generation rate of the respective events which relate to the "operation rate of the controller CTL1 in the storage apparatus SYS1" and which are defined in the condition portions. As a result of the calculation, the total generation rate becomes 0/4.

Since the total generation rate is less than a fixed value, the event analysis processing module 33500 determines a threshold after correction, with reference to the analysis result management table 34000. It is shown in the analysis result management table 34000 that the performance values at the time of generation of the "threshold-based abnormal events related to the operation rate of the controller CTL1 in the storage apparatus SYS1" are 40% and 45%. Thus, a value of 42.5%, which is the average of these values, is set as the new threshold.

The event analysis processing module 33500 displays the new threshold on the GUI screen, to confirm to the user whether or not the threshold can be changed. When the user permits to change the threshold, the event analysis processing module 33500 changes, into the calculated value, the threshold in the apparatus performance management table.

Subsequently, when the threshold of the operation rate of the controller CTL1 in the storage apparatus SYS1 is lowered in the course of the threshold re-calculation processing, the threshold is lowered within the range in which the threshold is not less than the value of 42.5% that is calculated as the measured value based threshold.

The measured value based threshold in the apparatus performance management table, which relates to the "operation rate of the controller CTL1 in the storage apparatus SYS1," is set by the above processing.

Note that the threshold re-calculation processing using the measured value based threshold may also be configured such that, with reference to the configuration information of the managed apparatuses, which information is held in the acquired information repository 32000, the event analysis processing module 33500 collectively performs the measured value based threshold setting to the components having the same performance characteristics as those of the component in the apparatus, the threshold of which component is to be reset. For example, in the case where the disks 24200 and 24210, which configure the RAID group 24000 of the storage apparatus 20000, are the same type and have the same performance characteristics, the event analysis processing module 33500 may perform the measured value based threshold reset processing for a metric of the disk 24200 simultaneously with the measured value based threshold reset processing for the same metric of the disk 24210.

<Effect of Threshold Re-Calculation Processing Using Measured Value Based Threshold>

As described above, the system management software performs the threshold re-calculation processing on the basis of the event hit state in the expansion rule used to the performance fault analysis based on the fault cause analysis function of the system management software itself, and corrects the threshold set higher or lower as compared with original performance of the apparatus. As a result, the threshold given to the managed component is made to match with the performance capacity of the component, so that a warning can be accurately issued to the manager by the management software.

Further, the threshold fluctuation in the threshold re-calculation processing can be prevented by setting the measured value based threshold.

(3) Third Embodiment

A third embodiment relates to the construction of the analysis result management table by the managed software. Since the system configuration and the configuration of each of the apparatuses are the same as those of the first embodiment, and hence the explanation thereof is omitted.

<Configuration of Analysis Result Management Table>

FIG. 26 shows a configuration example of the analysis result management table 34000 provided in the management server 30000 according to the third embodiment. Unlike the analysis result management table shown in FIG. 18, in the analysis result management table 34000, the measured value 34070 at the time of reception is not included as the configuration item. However, the analysis result management table 34000 further includes, as the configuration items, a field 34090 for registering the name of the metric of the event having the lowest threshold correction priority, among the events other than the event determined as the root cause in the fault cause analysis processing, and also the field 34100 for registering the threshold of the event. The configuration of the other fields is the same as the configuration shown in FIG. 18.

<Details of Analysis Result Management Table Construction Processing>

Figure 27:
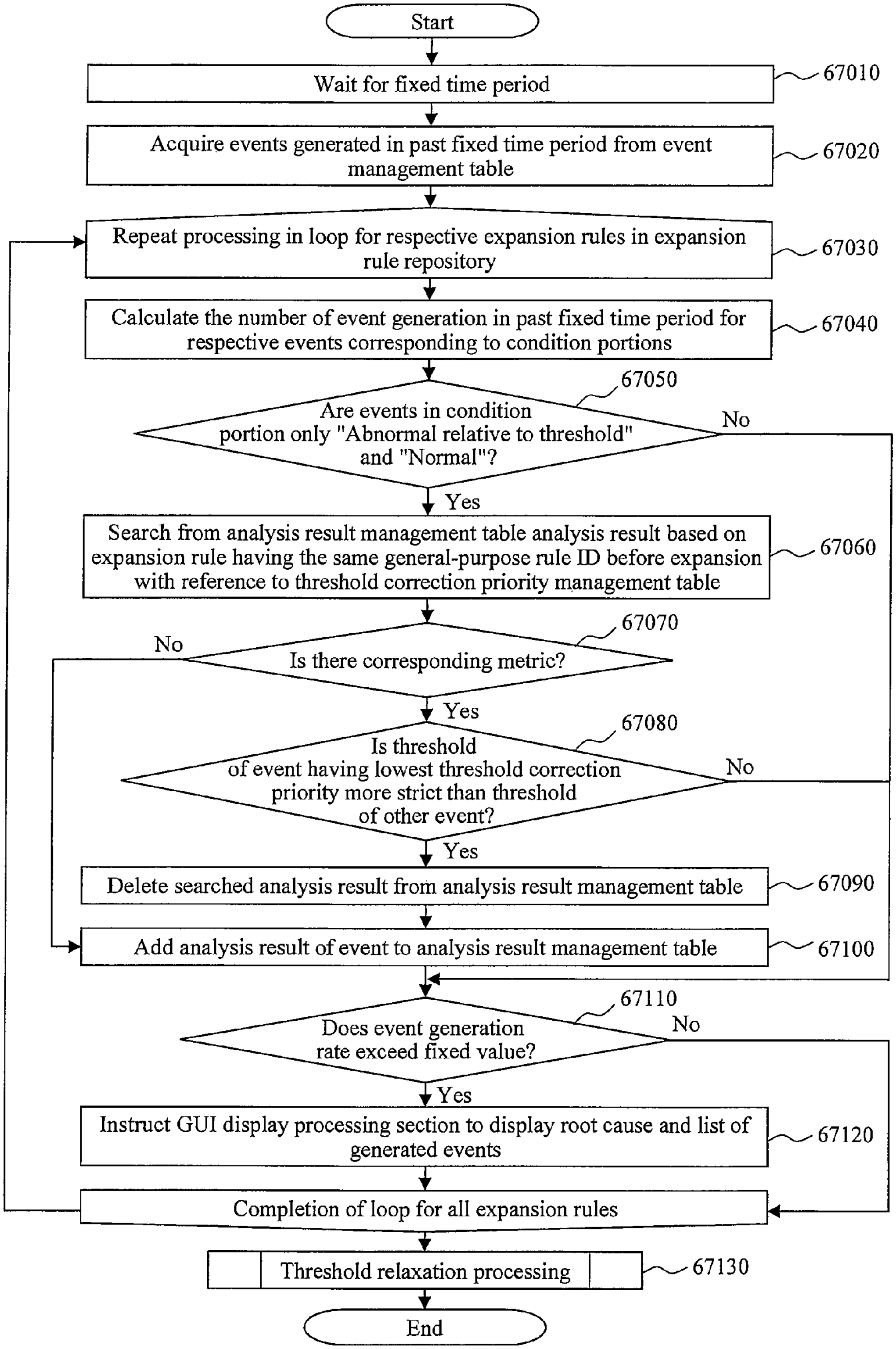
FIG. 27 is a flow chart for explaining analysis result management table construction processing as a whole, which is performed by the management server in the third embodiment.

FIG. 27 is a flow chart for explaining the fault cause analysis and the analysis result management table construction processing which are performed by the event analysis processing module 33500 of the management server 30000 according to the third embodiment.

The event analysis processing module 33500 stands by for a fixed time period to wait for reception of an event generated later than the first event (step 67010). Then, the event analysis processing module 33500 acquires the events generated in the past fixed time period from the management table 33700 (FIG. 13) (step 67020). Then, the event analysis processing module 33500 repeatedly performs a series of processing from step 67040 to step 67120 to each of the expansion rules in the expansion rule repository 33900 (step 67030), and performs the threshold relaxation processing (step 67130) after the completion of the repetition processing.

In the repetition processing, the event analysis processing module 33500 first calculates the number of events each of which corresponds to the condition portion of the expansion rule and which were generated in the past fixed period (step 67040). Then, the event analysis processing module 33500 determines whether or not the event statuses corresponding to the respective condition portions of the expansion rule include only the "threshold-based abnormal status" or the "normal status" (for the purpose of eliminating the "fault status") (step 67050). When determining that the event statuses corresponding to the condition portions are configured only by the "threshold-based abnormal status" and the "normal status" (Yes in step 67050), the event analysis processing module 33500 selects the analysis results which are based on the expansion rule having the same general-purpose rule ID before expansion as the general-purpose rule ID before expansion that is described in the expansion rule, and which also have the same analysis start date and time (step 67060). When determining that there is an event status other than the "threshold-based abnormal status" or the "normal status" (No in step 67050), the event analysis processing module 33500 shifts to the processing of step 67110.

Next, the event analysis processing module 33500 determines whether or not the corresponding analysis result exists (step 67070). When determining that there is no corresponding metric (No in step 67070), the event analysis processing module 33500 shifts to the processing of step 67100.

In step 67100, the event analysis processing module 33500 adds the apparatus ID, the portion ID, and the name of the metric, which correspond to the event having the highest threshold correction priority, to the fields 34010, 34020, and 34030 of the analysis result management table 34000, respectively. Also, the event analysis processing module 33500 adds the event generation status to the field 34050, and adds the expansion rule ID and the analysis start date and time to the fields 34040 and 34080, respectively. Further, with reference to the apparatus performance management table 32100, among the events described in the expansion rule, the event analysis processing module 33500 respectively registers the name of the metric and the threshold of the event having the lowest threshold correction priority into the fields 34090 and 34100 of the analysis result management table 34000. Further, the event analysis processing module 33500 calculates the generation rate of each of the events defined in the condition portions other than the event having the highest threshold correction priority, and adds the calculation results to the field 34060 of the analysis result management table 34000 (step 67100). However, among the events described in the condition portions, the event of "normal status" is not taken as the target of the calculation.

On the other hand, when determining that the corresponding analysis result exists (Yes in step 67070), the event analysis processing module 33500 compares the threshold of the event having the lowest threshold correction priority with the value defined in the reference threshold 34090 of the calculation analysis result management table 34000, to determine whether or not the threshold of the event having the lowest threshold correction priority is more strict than the threshold of the other events (step 67080).

When the threshold of the event having the lowest threshold correction priority is more strict than the value of the reference event threshold (Yes in step 67080), the event analysis processing module 33500 once deletes the analysis result detected in step 67060 from the analysis result management table 34000 (step 67090). Further, the event analysis processing module 33500 performs the registration of the analysis result in the analysis result management table 34000 (step 67100).

On the other hand, when the threshold of the event having the lowest threshold correction priority (or the event having the lower threshold correction priority) is less strict than the value of the reference threshold (No in step 67080), the event analysis processing module 33500 shifts to the processing of step 67110.

Subsequently, the event analysis processing module 33500 determines whether or not the number of generation of the events, which is totaled in step 67040, exceeds a fixed rate, for all the events described in the condition portions of the expansion rule (step 67110). When the total number of events exceeds the fixed rate (Yes in step 67110), the event analysis processing module 33500 instructs the GUI display processing module 33400 to display the event estimated as the root cause together with the event generation rate in the condition sentence (step 67120). When the total number of events does not exceed the fixed rate (No in step 67110), the event analysis processing module 33500 shifts to the processing for the next expansion rule or the processing of step 67130.

After performing processing to all the expansion rules, the event analysis processing module 33500 performs the threshold relaxation processing described in the first embodiment (step 67130).

Subsequently, a specific example of the analysis result management table construction processing will be described. Note that it is assumed that the analysis result management table at the time of start of the processing is shown in FIG. 26, that the apparatus performance management table is shown in FIG. 11, that the threshold correction priority management table is shown in FIG. 19, that the threshold correction rate management table is shown in FIG. 20, and that the expansion rule ExRule1-3 is shown in FIG. 15C.

When a "threshold-based abnormal event related to the operation rate of the controller CTL1 in the storage apparatus SYS1" (generation date and time: 2010-01-01 16:00:00) is registered in the event management table shown in FIG. 13, the event analysis processing module waits for a fixed time period, and then acquires the events generated in the past fixed time period with reference to the event management table.

Next, with reference to the general-purpose rule ID before expansion described in the expansion rule ExRule1-3 in the expansion rule repository 33900, the event analysis processing module 33500 selects the analysis results which are based on the expansion rule having the same general-purpose rule ID before the expansion, and which have the same analysis start date and time. In the analysis result management table 34000 in FIG. 26, the analysis results whose analysis start date and time is 2010-01-01 16:05:00, and whose expansion rule is ExRule1-1 and ExRule1-2 corresponds to the analysis results selected by the event analysis processing module 33500.

The event analysis processing module 33500 refers to the reference event threshold about these analysis results. The reference event threshold of ExRule1-1 and ExRule 1-2 is set to 10 msec. On the other hand, the threshold of the event which has the lowest threshold correction priority in ExRule1-3, and which relates to the "response time of the drive (E:) in the server HOST2", is set to 8 msec in the apparatus performance management table shown in FIG. 11.

In this case, since the threshold of the event having the lowest threshold correction priority is more strict than the value of the reference event threshold, the event analysis processing module 33500 deletes, from the analysis result management table, the analysis results corresponding to the detected expansion rule of ExRule1-1 and ExRule1-2. By the deleting processing, the analysis results are excluded from the target of threshold change evaluation.

Next, with reference to the threshold correction priority management table 34100, the event analysis processing module 33500 selects the event having the highest threshold correction priority among the events respectively corresponding to the condition portions of the expansion rule ExRule1-3. In the expansion rule ExRule1-3, the threshold correction priority of the "operation rate of the controller CTL1 in the storage apparatus SYS1" is highest. The threshold-based abnormal event related to the "operation rate of the controller CTL1 in the storage apparatus SYS1" has been generated in the past fixed time period. On the other hand, the other event defined in the condition portions of the expansion rule is the threshold-based abnormal event related to the "response time of the logical volume (E:) in the host computer HOST2," and the event has not been generated in the past fixed time period. Therefore, the generation rate of each of the events defined in the other condition portions becomes 0/1.

Further, the threshold of the "response time of the drive (E:) in the server HOST2," which relates to the event having the lowest threshold correction priority in ExRule1-3, is set to 8 msec according to the apparatus performance management table 32100 shown in FIG. 11. The above result is added to the calculation analysis result management table.

<Effect of Analysis Result Management Table Construction Processing>

As described above, the system management software performs the threshold re-calculation processing on the basis of the event hit state in the expansion rule used to the performance fault analysis based on the fault cause analysis function of the system management software itself, and corrects the threshold which is set higher or lower as compared with original performance of the apparatus. As a result, the threshold given to the managed component is made to match with the performance capacity of the component, so that a warning can be accurately issued to the manager by the managed software.

Further, in the case where mutually different thresholds are respectively given to the same performance metric in a plurality of apparatuses connected to one component, the most strict threshold among these mutually different thresholds is used as the threshold at the time of re-calculation of the threshold, whereby it is possible to prevent that the threshold is excessively relaxed by the threshold re-calculation processing.

In particular, according to the present embodiment, in the case where the threshold of the device having a high threshold correction priority is set to be more relaxed than the device having a low threshold correction priority, the threshold of the device having the high threshold correction priority is set to match with the threshold which is strictly set. In the case where the threshold of the device having a high threshold correction priority is set to be more strict than the device having a low threshold correction priority, it is prevented that the threshold of the device having the high threshold correction priority is relaxed in correspondence with the device having the low threshold correction priority. With this configuration, it is possible to more strictly manage the threshold of an important device.

(4) Summary

In the present invention, the management server (processor) monitors a node apparatus (a storage apparatus and a host computer), and acquires a processing performance value which represents the processing performance of each of configuration devices (a controller, an I/O port, a drive). Further, the management server compares the threshold set for each of the configuration devices with the acquired processing performance value, so as to detect abnormality in the performance of each of the configuration devices. Then, the management server collates the detected performance of each of the configuration devices with an expansion rule which is generated from the general-purpose rule (FIG. 14) (and which represents, as shown in FIG. 15, a relationship between a combination of one or more condition events that can be generated in the node apparatus (and that are configured by a cause event directly relating to the root cause of a fault and by related events generated together with the cause event at the time of generation of the fault) and a conclusion event that is estimated as the root cause of the combination of the condition events). Thereby, the management server specifies a configuration device whose threshold needs to be corrected, and adjusts the threshold of the configuration device. More specifically, when a cause event of the expansion rule is generated or is not generated, the management server checks the presence of generation of the related event, and detects the necessity of threshold correction on the basis of the generation rate of the related event. With this configuration, the threshold, which is set for each of the configuration devices and which is used for the performance management, can be set to a suitable value matched with the performance capacity of each of the configuration devices.

Further, when adjusting the threshold of the specified configuration device (controller 1) of the node apparatus (storage apparatus 1 having the controller 1), the management server also changes, into the adjusted threshold (adjusted threshold of the controller 1), the threshold of the configuration device (controller 2) which is the same as the specified configuration device (controller 1) and which is included in the other node apparatus (storage apparatus 2 having the controller 2) that is different from the node apparatus (storage apparatus 1) having the specified configuration device (controller 1). With this configuration, since the threshold of the same components can be simultaneously changed into the suitable value, it is possible to improve the efficiency in the management of the system.

Note that the threshold adjustment method may also be configured such that the threshold after adjustment is calculated according to the correction rule (FIG. 20) representing a predetermined change width, or such that a calculated average value of the measured performance values of the specified configuration device is used as the threshold after adjustment.

Further, the management server is configured so as to manage the threshold correction priority information (FIG. 19) according to the kind of configuration device. Further, the priority of the configuration device which generates the cause event is set higher than the priority of the configuration device which generates the related event. At this time, the management server manages the presence of generation of the cause event and the related event in the configuration devices which are to be examined in the analysis result table (FIG. 26), and also manages the reference threshold of the configuration device whose priority is set low. Further, the management server determines whether or not the threshold of the other node apparatus, which has the same configuration device as the configuration device whose priority is set low, is set more strictly than the reference threshold. When the threshold of the other node apparatus is set more strictly than the reference threshold, the management server performs management so that the configuration device to be examined is excluded from the target of threshold value adjustment. With this configuration, it is possible to avoid the inconvenience that, despite fact that a strict threshold is set in the other device, the threshold of the same device is relaxed merely because of generation of a cause event.

Note that the present invention can also be realized by a program code of software which realizes the functions of the embodiments. In this case, a storage medium, in which the program code is recorded, is provided in a system or an apparatus, and a computer (or CPU or MPU) of the system or the apparatus reads the program code stored in the storage medium. In this case, the program code itself read from the storage medium realizes the functions of the above described embodiments, and hence the program code itself and the storage medium storing the program code configure the present invention. For example, a flexible disk, a CD-ROM, a DVD-ROM, a hard disk, an optical disk, a magneto-optical disk, a CD-R, a magnetic tape, a nonvolatile memory card, a ROM, and the like, are used as storage media used to provide such program code.

Further, it may also be configured such that an OS (operating system), and the like, operating on the computer performs all of or a part of the actual processing on the basis of the instruction of the program code, so as to thereby realize the functions of the above described embodiments by the processing. Further, it may also be configured such that the program code read from the storage medium is written in a memory on the computer, and thereafter a CPU, or the like, of the computer performs a part of or all of the actual processing on the basis of the instruction of the program code, so as to thereby realize the functions of the above described embodiments by the processing.

Further, it may also be configured such that the program code of software which realizes the functions of the embodiments is distributed via a network, so as to be stored in storage means, such as a hard disk and a memory, of a system or an apparatus, or stored in a storage medium, such as a CD-RW and a CD-R, and such that a computer (or CPU or MPU) of the system or the apparatus reads, at the time of use, the program code stored in the storage means or the storage medium, and executes the program code.

REFERENCE SIGNS LIST

10000: Server, 20000: Storage apparatus, 30000: Management server, 35000: WEB browser start server, 40000: IP switch, 45000: Network

The invention claimed is:

1. A system management method in a computer system including a node apparatus to be monitored, and a management system, which is coupled to the node apparatus using a network and which is configured to manage the node apparatus, the method comprising:

by the management system, acquiring a processing performance value representing processing performance of a configuration device configuring the node apparatus, by the management system, detecting an abnormality in the performance of the configuration device on the basis of comparison between a threshold set for the configuration device and the acquired processing performance value, by the management system, specifying a configuration device whose threshold needs to be corrected by collating the detected performance of each of the configuration devices with an analysis rule representing a relationship between a combination of one or more condition events which can be generated in the node apparatus, and a conclusion event which is estimated as a root cause of the combination of the condition events, and by the management system, adjusting the threshold of the specified configuration device and managing the node apparatus by using the adjusted threshold;

wherein adjusting threshold further comprises, by the management system, changing into the adjusted threshold the threshold of the configuration device which is included in the other node apparatus different from the node apparatus having the specified configuration device, and which is the same as the specified configuration device;

wherein the management system has, in a memory, threshold correction priority information according to the kind of the configuration device;

wherein the analysis rule has, as the condition event, a combination of a cause event directly relating to a root cause of a fault and a related event generated together with the cause event at the time of generation of the fault; and wherein the priority of the configuration device, which is configured to generate the cause event, is set higher than the priority of the configuration device, which is configured to generate the related event;

the method further comprising:

by the management system, managing, in the configuration device to be examined, the presence of generation of the cause event and the related event and a reference threshold of the configuration device whose priority is set low;

by the management system, determining whether or not the threshold of the other node apparatus, which has the same configuration device as the configuration device whose priority is set low, is set more strictly than the reference threshold; and by the management system, excluding the configuration device to be examined from the target of the threshold adjustment, when the threshold of the other node apparatus is set more strictly than the reference threshold.

2. A system management method according to claim 1, further comprising:

by the management system, displaying the adjusted threshold on a display screen of a display device for displaying the information of the management server.

3. A system management method according to claim 1, wherein specifying the configuration device whose threshold needs to be corrected further comprises, by the management system, detecting the presence of generation of the related event according to the generation state of the cause event and determining the necessity of the threshold correction on the basis of the generation rate of the related event.

4. A system management method according to claim 3, wherein adjusting the threshold further comprises, by the management system, calculating the threshold after adjustment according to a correction rule which represents a predetermined change width.

5. A system management method according to claim 3, wherein adjusting the threshold further comprises, by the management system, calculating an average of measured performance values of the specified configuration device and setting the average value as the threshold after adjustment.

6. A management system, which is connected, using a network, to a node apparatus to be monitored, and which is configured to manage the node apparatus, comprising:

a processor configured to acquire a processing performance value, which represents the processing performance of each of configuration devices of the node apparatus; and a memory that stores an analysis rule representing a relationship between a combination of one or more condition events, which can be generated in the node apparatus, and a conclusion event, which is estimated as a root cause of the combination of the condition events, wherein the processor is configured to:

detect an abnormality in the performance of each of the configuration devices on the basis of comparison between the acquired processing performance value and a threshold set for each of the configuration devices;

specify the configuration device whose threshold needs to be corrected by collating the analysis rule with the detected performance of each of the configuration devices; and adjust the threshold of the specified configuration device;

wherein the processor is configured to change, into the threshold after adjustment, the threshold of the configuration device which is included in the other node apparatus different from the node apparatus having the specified configuration device, and which is the same as the specified configuration device;

wherein the management system has, in the memory, correction priority information of the threshold according to the kind of the configuration device;

wherein the memory has, as the condition event of the analysis rule, a combination of a cause event directly relating to a root cause of a fault and a related event generated together with the cause event at the time of generation of the fault;

wherein the priority of the configuration device, which is configured to generate the cause event, is set higher than the priority of the configuration device, which is configured to generate the related event; and wherein the processor is configured to:

manage, in the configuration device to be examined, the presence of generation of the cause event and generation of the related event, and a reference threshold of the configuration device whose threshold is set low;

determine whether or not the threshold of the other node apparatus, which has the same configuration device as the configuration device whose threshold is set low, is set more strictly than the reference threshold; and exclude, when the threshold of the other node apparatus is set more strictly than the reference threshold, the configuration device to be examined from the target of threshold adjustment.

7. A management system according to claim 6, wherein the processor is configured to display the threshold after adjustment on a display screen of a display device.

8. A management system according to claim 6, wherein the processor is configured to detect the presence of generation of the related event according to the generation state of the cause event and to specify a configuration device whose threshold needs to be corrected on the basis of the generation rate of the related event.

9. A management system according to claim 8, wherein the processor is configured to adjust the threshold according to a correction rule representing a predetermined change width and to calculate the threshold after adjustment.

10. A management system according to claim 8, wherein the processor is configured to calculate an average of measured performance values of the specified configuration device and to set the average value as the threshold value after adjustment.

11. A management system according to claim 6, wherein the node apparatus includes one or more storage apparatuses and one or more host computers, wherein the storage apparatus includes a controller and an I/O port as the configuration devices, wherein the host computer includes a drive as the configuration device, wherein the memory has, as the condition event of the analysis rule, a combination of a cause event directly relating to a root cause of a fault and a related event generated together with the cause event at the time of generation of the fault, wherein the processor is configured to:

detect the presence of generation of the related event at the time of generation of the cause event;

specify, on the basis of the generation rate of the related event, a configuration device whose threshold needs to be corrected, thereby adjusting the threshold of the specified configuration device according to a correction rule representing a predetermined change width, or thereby calculating an average of measured performance values of the specified configuration device, so as to set the average value as the threshold value after adjustment;

display the threshold after the adjustment on a display screen of a display device; and change, into the threshold value after the adjustment, the threshold of the configuration device which is included in the other node apparatus different from the node apparatus having the specified configuration device, and which is the same as the specified configuration device.

* * * * *

UNITED STATES PATENT AND TRADEMARK OFFICE

CERTIFICATE OF CORRECTION

PATENT NO. : 8,554,906 B2
APPLICATION NO. : 12/812708
DATED : October 8, 2013
INVENTOR(S) : Takayuki Nagai and Masashi Kunii It is certified that error appears in the above-identified patent and that said Letters Patent is hereby corrected as shown below:

Title Page, below Item (54)

(76) Inventors: Takayuki Nagai, Machida (JP);
Masashi Kunii, Yokohama (JP)

Should read

(75) Inventors: Takayuki Nagai, Machida (JP);
Masashi Kunii, Yokohama (JP)

Title Page, below Inventors, insert

-- (73) Assignee: Hitachi, Ltd., Tokyo (JP) --

Signed and Sealed this
Twenty-fourth Day of December, 2013

Margaret A. Focarino

Margaret A. Focarino
*Commissioner for Patents of the United States Patent and Trademark Office*